United States Patent
Ori

(10) Patent No.: US 8,000,024 B2
(45) Date of Patent: Aug. 16, 2011

(54) ZOOM LENS AND IMAGING APPARATUS

(75) Inventor: Tetsuya Ori, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 12/629,517

(22) Filed: Dec. 2, 2009

(65) Prior Publication Data

US 2010/0134900 A1 Jun. 3, 2010

(30) Foreign Application Priority Data

Dec. 3, 2008 (JP) ................................. 2008-308701

(51) Int. Cl.
*G02B 15/14* (2006.01)
*H04N 5/262* (2006.01)

(52) U.S. Cl. ...................... 359/687; 359/686; 348/240.3

(58) Field of Classification Search ............... 348/240.3; 359/684, 685, 686, 687

See application file for complete search history.

(56) References Cited

U.S. PATENT DOCUMENTS

| | | | |
|---|---|---|---|
| 7,420,745 B2 * | 9/2008 | Ohashi | 359/687 |
| 7,667,899 B2 * | 2/2010 | Ori | 359/687 |
| 2005/0168832 A1 | 8/2005 | Hamano | |
| 2006/0193062 A1 | 8/2006 | Ohashi | |

FOREIGN PATENT DOCUMENTS

| | | |
|---|---|---|
| JP | 3392881 B2 | 3/2003 |
| JP | 2005-215385 A | 8/2005 |
| JP | 3706783 B2 | 10/2005 |
| JP | 2006-235062 A | 9/2006 |

\* cited by examiner

*Primary Examiner* — David N Spector
(74) *Attorney, Agent, or Firm* — Birch, Stewart, Kolasch & Birch, LLP

(57) ABSTRACT

A zoom lens is provided and includes: a first lens group having a positive power, a second lens group having a negative power, a stop, a third lens group having a positive power, and a fourth lens group having a positive power in order. Zooming is performed by moving at least the first lens group, the second lens group, the stop, and the third lens group along the optical axis. During zooming, the stop is moved so as to be closer to an image plane at a wide-angle end than at a telephoto end and to be closer to the second lens group at the telephoto end than at the wide-angle end. The following conditional expressions (1) and (2) are satisfied. For the conditional expressions (1) and (2), fw is a focal length at the wide-angle end of the entire system, ft is a focal length at the telephoto end of the entire system, f1 is a composite focal length of the first lens group, and X1 is a displacement of the first lens group during zooming from the wide-angle end to the telephoto end.

$$4.0 < f1/fw < 7.0 \quad (1)$$

$$0.2 < X1/ft < 0.3 \quad (2)$$

12 Claims, 26 Drawing Sheets

EXAMPLE 1

EXAMPLE 1

WIDE-ANGLE END

INTERMEDIATE

TELEPHOTO END

EXAMPLE 2

WIDE-ANGLE END

INTERMEDIATE

TELEPHOTO END

EXAMPLE 3

WIDE-ANGLE END

INTERMEDIATE

TELEPHOTO END

EXAMPLE 4

WIDE-ANGLE END

INTERMEDIATE

TELEPHOTO END

EXAMPLE 5

WIDE-ANGLE END

INTERMEDIATE

TELEPHOTO END

FIG. 6A

| | EXAMPLE 1 · BASIC LENS DATA | | | | |
|---|---|---|---|---|---|
| | Si (SURFACE NO.) | Ri (RADIUS OF CURVATURE) | Di (SURFACE SPACING) | Ndi (REFRAC-TIVE INDEX) | νdj (ABBE NUMBER) |
| G1 | 1 | 40.1171 | 0.81 | 1.91411 | 20.9 |
| | 2 | 24.1440 | 2.81 | 1.60104 | 65.4 |
| | 3 | -2813.7055 | 0.10 | 1.00000 | |
| | 4 | 20.0552 | 2.10 | 1.75197 | 52.3 |
| | 5 | 53.0092 | D5 (VARIABLE) | 1.00000 | |
| G2 | 6 | 57.8230 | 0.60 | 1.87852 | 40.8 |
| | 7 | 4.5902 | 2.17 | 1.00000 | |
| | 8 | -18.7093 | 0.55 | 1.81235 | 46.6 |
| | 9 | 12.0145 | 0.10 | 1.00000 | |
| | 10 | 8.8037 | 1.87 | 1.91411 | 20.9 |
| | 11 | -228.0384 | D11 (VARIABLE) | 1.00000 | |
| | 12 (APERTURE DIAPHRAGM) | — | D12 (VARIABLE) | 1.00000 | |
| G3 | 13 | 5.3686 | 3.66 | 1.78453 | 47.4 |
| | 14 | -7.7900 | 0.50 | 1.89780 | 31.3 |
| | 15 | 5.3182 | 0.15 | 1.00000 | |
| | *16 | 5.4133 | 1.66 | 1.51357 | 62.8 |
| | *17 | -37.3393 | D17 (VARIABLE) | 1.00000 | |
| G4 | *18 | 20.1616 | 1.75 | 1.57833 | 59.5 |
| | 19 | -100.6793 | D19 (VARIABLE) | 1.00000 | |
| | 20 | ∞ | 0.80 | 1.51680 | 64.2 |
| | 21 | ∞ | | 1.00000 | |

(*: ASPHERIC SURFACE) (f=5.16~48.55mm, FNO.=3.37~5.57, 2ω=84.4°~9.8°)

FIG. 6B

| EXAMPLE 1 · VARIABLE SURFACE SPACING DATA | | | |
|---|---|---|---|
| SURFACE SPACING | WIDE-ANGLE END (f=5.16) | INTERMEDIATE (f=14.92) | TELEPHOTO END (f=48.55) |
| D5 | 0.30 | 7.77 | 17.20 |
| D11 | 8.85 | 4.58 | 0.90 |
| D12 | 4.10 | 0.80 | 0.80 |
| D17 | 3.68 | 7.19 | 14.11 |
| D19 | 6.73 | 10.09 | 3.83 |

FIG. 7

| | EXAMPLE 1 · ASPHERIC DATA | | | | |
|---|---|---|---|---|---|
| SUR-FACE NO. | COEFFICIENT | | | | |
| | K | A3 | A4 | A5 | A6 |
| 16 | 3.153373E+00 | -2.412010E-04 | -1.950495E-03 | -9.588545E-05 | -1.423699E-04 |
| 17 | 8.612083E+00 | -6.788253E-04 | 3.508109E-03 | -1.560036E-03 | 7.855997E-04 |
| 18 | 7.175370E+00 | -6.672927E-04 | 5.972840E-04 | -2.177481E-04 | 4.426598E-05 |
| | A7 | A8 | A9 | A10 | A11 |
| 16 | -7.842921E-05 | 8.878290E-05 | -3.469635E-05 | -6.537844E-06 | 2.284204E-06 |
| 17 | -3.076430E-05 | -7.371990E-05 | 1.779189E-05 | 1.220060E-07 | -2.289628E-07 |
| 18 | -3.141854E-06 | -1.779956E-06 | 4.302644E-07 | 2.730410E-08 | 4.536840E-09 |
| | A12 | A13 | A14 | | |
| 16 | 1.199905E-06 | -1.396143E-07 | -8.122116E-08 | | |
| 17 | 1.335783E-07 | -1.011336E-07 | 2.789094E-08 | | |
| 18 | -2.125445E-09 | -1.200887E-09 | 2.217190E-10 | | |

FIG. 8A

| | EXAMPLE 2 · BASIC LENS DATA | | | | |
|---|---|---|---|---|---|
| | Si (SURFACE NO.) | Ri (RADIUS OF CURVATURE) | Di (SURFACE SPACING) | Ndi (REFRACTIVE INDEX) | νdj (ABBE NUMBER) |
| G1 | 1 | 38.4507 | 0.82 | 1.92286 | 18.9 |
| | 2 | 25.0000 | 2.71 | 1.59240 | 68.3 |
| | 3 | 753.6487 | 0.10 | 1.00000 | |
| | 4 | 19.9268 | 2.30 | 1.75500 | 52.3 |
| | 5 | 50.5796 | D5 (VARIABLE) | 1.00000 | |
| G2 | 6 | 51.2678 | 0.60 | 1.88300 | 40.8 |
| | 7 | 4.5162 | 2.35 | 1.00000 | |
| | 8 | −18.3542 | 0.55 | 1.83481 | 42.7 |
| | 9 | 10.8200 | 0.10 | 1.00000 | |
| | 10 | 8.5312 | 1.85 | 1.92286 | 20.9 |
| | 11 | −149.3910 | D11 (VARIABLE) | 1.00000 | |
| | 12 (APERTURE DIAPHRAGM) | — | D12 (VARIABLE) | 1.00000 | |
| G3 | 13 | 5.5407 | 3.87 | 1.77250 | 49.6 |
| | 14 | −11.5146 | 0.50 | 1.90366 | 31.3 |
| | 15 | 5.2769 | 0.10 | 1.00000 | |
| | *16 | 4.8768 | 1.62 | 1.51760 | 63.5 |
| | *17 | −31.6657 | D17 (VARIABLE) | 1.00000 | |
| G4 | *18 | 19.9278 | 1.70 | 1.51760 | 63.5 |
| | *19 | −381.6713 | D19 (VARIABLE) | 1.00000 | |
| | 20 | ∞ | 0.80 | 1.51680 | 64.2 |
| | 21 | ∞ | | 1.00000 | |

(*: ASPHERIC SURFACE) (f=5.16~48.58mm, FNO.=3.49~5.95, 2ω=82.6°~9.4°)

FIG. 8B

| EXAMPLE 2 · VARIABLE SURFACE SPACING DATA | | | |
|---|---|---|---|
| SURFACE SPACING | WIDE-ANGLE END (f=5.16) | INTERMEDIATE (f=15.84) | TELEPHOTO END (f=48.58) |
| D5 | 0.30 | 8.25 | 17.25 |
| D11 | 8.87 | 4.64 | 1.24 |
| D12 | 4.40 | 0.40 | 0.40 |
| D17 | 5.95 | 6.83 | 13.71 |
| D19 | 4.99 | 10.61 | 4.36 |

FIG. 9

| | EXAMPLE 2 · ASPHERIC DATA | | | | |
|---|---|---|---|---|---|
| SUR-FACE NO. | COEFFICIENT | | | | |
| | K | A3 | A4 | A5 | A6 |
| 16 | 2.489945E-01 | -2.942141E-04 | 1.657469E-04 | -2.012629E-05 | -1.338236E-04 |
| 17 | -2.889564E+00 | -5.430293E-04 | 2.238746E-03 | -2.568682E-04 | 3.554016E-05 |
| 18 | 8.557676E+00 | -1.423204E-03 | -1.334024E-04 | -3.480034E-05 | 9.453415E-06 |
| 19 | 2.913442E+00 | -1.104773E-03 | -3.794178E-04 | 3.036764E-05 | 8.932761E-06 |
| | A7 | A8 | A9 | A10 | |
| 16 | 7.983097E-06 | 1.573970E-05 | 1.358903E-06 | -1.483540E-06 | |
| 17 | 3.441090E-05 | -7.497822E-07 | -1.032725E-06 | 4.130661E-07 | |
| 18 | -8.859276E-06 | -7.376086E-07 | 3.299693E-07 | 2.266156E-08 | |
| 19 | -4.558220E-06 | -1.797718E-06 | -5.040042E-08 | 1.074760E-07 | |

FIG. 10A

| | EXAMPLE 3 · BASIC LENS DATA | | | | |
|---|---|---|---|---|---|
| | Si (SURFACE NO.) | Ri (RADIUS OF CURVATURE) | Di (SURFACE SPACING) | Ndi (REFRAC- TIVE INDEX) | vdj (ABBE NUMBER) |
| G1 | 1 | 36.5807 | 0.82 | 1.93432 | 18.9 |
| | 2 | 24.0000 | 2.71 | 1.60520 | 65.4 |
| | 3 | 472.1323 | 0.10 | 1.00000 | |
| | 4 | 20.7558 | 2.30 | 1.75844 | 52.3 |
| | 5 | 55.0212 | D5(VARIABLE) | 1.00000 | |
| G2 | 6 | 56.3728 | 0.60 | 1.88814 | 40.8 |
| | 7 | 4.6090 | 2.30 | 1.00000 | |
| | 8 | -16.2725 | 0.55 | 1.83946 | 42.7 |
| | 9 | 12.3478 | 0.10 | 1.00000 | |
| | 10 | 9.2247 | 1.85 | 1.93324 | 20.9 |
| | 11 | -69.5244 | D11(VARIABLE) | 1.00000 | |
| | 12 (APERTURE DIAPHRAGM) | — | D12(VARIABLE) | 1.00000 | |
| G3 | 13 | 5.4894 | 3.97 | 1.80810 | 46.6 |
| | 14 | -7.9715 | 0.50 | 1.91048 | 31.3 |
| | 15 | 4.9303 | 0.10 | 1.00000 | |
| | *16 | 4.7383 | 1.65 | 1.51954 | 63.5 |
| | *17 | -82.3056 | D17(VARIABLE) | 1.00000 | |
| G4 | *18 | 14.2339 | 1.79 | 1.51954 | 63.5 |
| | 19 | 0.0000 | D19(VARIABLE) | 1.00000 | |
| | 20 | ∞ | 0.80 | 1.51872 | 64.2 |
| | 21 | ∞ | | 1.00000 | |

(*: ASPHERIC SURFACE) (f=5.16~48.68mm, FNO.=3.42~5.98, 2ω=82.2°~9.4°)

FIG. 10B

| EXAMPLE 3 · VARIABLE SURFACE SPACING DATA | | | |
|---|---|---|---|
| SURFACE SPACING | WIDE-ANGLE END (f=5.16) | INTERMEDIATE (f=14.95) | TELEPHOTO END (f=48.68) |
| D5 | 0.30 | 7.26 | 17.02 |
| D11 | 9.04 | 4.94 | 1.32 |
| D12 | 4.40 | 0.40 | 0.40 |
| D17 | 4.39 | 7.47 | 13.71 |
| D19 | 5.95 | 10.15 | 4.35 |

FIG. 11

| SUR-FACE NO. | COEFFICIENT | | | | |
|---|---|---|---|---|---|
| | K | A3 | A4 | A5 | A6 |
| 16 | 2.138522E-01 | 3.471560E-04 | -6.788320E-04 | 6.036109E-04 | -4.972609E-05 |
| 17 | -4.515500E-03 | -1.488547E-04 | 2.623909E-03 | -9.621067E-04 | 6.208407E-04 |
| 18 | 4.130364E+00 | -4.850132E-04 | 3.979765E-04 | -1.706398E-04 | 3.039620E-05 |
| | A7 | A8 | A9 | A10 | |
| 16 | -2.165780E-04 | 6.455291E-05 | 1.065075E-05 | -5.031879E-06 | |
| 17 | -1.196775E-04 | -2.276333E-05 | 1.338193E-05 | -1.434121E-06 | |
| 18 | -2.683967E-06 | -4.178739E-07 | 2.348903E-07 | -2.796637E-08 | |

EXAMPLE 3 · ASPHERIC DATA

FIG. 12A

| | EXAMPLE 4 · BASIC LENS DATA | | | | |
|---|---|---|---|---|---|
| | Si (SURFACE NO.) | Ri (RADIUS OF CURVATURE) | Di (SURFACE SPACING) | Ndi (REFRACTIVE INDEX) | vdj (ABBE NUMBER) |
| G1 | 1 | 39.0400 | 0.81 | 1.92286 | 20.9 |
| | 2 | 24.2999 | 2.75 | 1.60300 | 65.4 |
| | 3 | -1913.6492 | 0.10 | 1.00000 | |
| | 4 | 20.1356 | 2.16 | 1.72916 | 54.7 |
| | 5 | 51.1694 | D5 (VARIABLE) | 1.00000 | |
| G2 | 6 | 46.7900 | 0.60 | 1.88300 | 40.8 |
| | 7 | 4.6206 | 2.22 | 1.00000 | |
| | 8 | -19.4433 | 0.55 | 1.83481 | 42.7 |
| | 9 | 12.3172 | 0.10 | 1.00000 | |
| | 10 | 8.8807 | 1.87 | 1.92286 | 20.9 |
| | 11 | -173.3346 | D11 (VARIABLE) | 1.00000 | |
| | 12 (APERTURE DIAPHRAGM) | — | D12 (VARIABLE) | 1.00000 | |
| G3 | 13 | 5.3415 | 3.72 | 1.78800 | 47.4 |
| | 14 | -7.8748 | 0.50 | 1.90366 | 31.3 |
| | 15 | 5.3407 | 0.15 | 1.00000 | |
| | *16 | 5.3346 | 1.63 | 1.51530 | 62.8 |
| | *17 | -99.4556 | D17 (VARIABLE) | 1.00000 | |
| G4 | *18 | 20.7271 | 1.75 | 1.58038 | 59.5 |
| | 19 | -100.0007 | D19 (VARIABLE) | 1.00000 | |
| | 20 | ∞ | 0.80 | 1.51680 | 64.2 |
| | 21 | ∞ | | 1.00000 | |

(*: ASPHERIC SURFACE) (f=5.32~50.05mm, FNO. =3.51~5.98, 2ω=81.0° ~9.6°)

FIG. 12B

| EXAMPLE 4 · VARIABLE SURFACE SPACING DATA | | | |
|---|---|---|---|
| SURFACE SPACING | WIDE-ANGLE END (f=5.32) | INTERMEDIATE (f=15.38) | TELEPHOTO END (f=50.05) |
| D5 | 0.30 | 7.84 | 17.44 |
| D11 | 9.46 | 5.15 | 1.10 |
| D12 | 4.10 | 0.60 | 0.60 |
| D17 | 3.35 | 7.10 | 13.81 |
| D19 | 7.01 | 10.21 | 3.82 |

FIG. 13

| SUR-FACE NO. | EXAMPLE 4 · ASPHERIC DATA ||||| 
|---|---|---|---|---|---|
| | COEFFICIENT |||||
| | K | A3 | A4 | A5 | A6 |
| 16 | 2.568650E+00 | 1.109362E-05 | -1.872282E-03 | 3.202620E-04 | -2.016327E-04 |
| 17 | -9.999999E+00 | -4.104282E-04 | 3.392468E-03 | -1.216676E-03 | 7.527613E-04 |
| 18 | 9.386776E+00 | -6.234579E-04 | 5.622262E-04 | -2.163524E-04 | 4.932695E-05 |
| | A7 | A8 | A9 | A10 | A11 |
| 16 | -1.445418E-04 | 1.014155E-04 | -1.577276E-05 | -7.768592E-06 | 1.162945E-06 |
| 17 | -7.297655E-05 | -7.066162E-05 | 2.700867E-05 | -1.290935E-06 | -6.272149E-07 |
| 18 | -6.645639E-06 | -1.274948E-06 | 7.031181E-07 | -5.143477E-08 | -1.024063E-09 |
| | A12 | A13 | A14 | | |
| 16 | 5.198673E-07 | -2.955846E-08 | -2.404799E-08 | | |
| 17 | 2.766685E-08 | -4.893782E-08 | 2.873551E-08 | | |
| 18 | 1.051549E-10 | -1.015943E-09 | 1.794100E-10 | | |

FIG. 14A

| | EXAMPLE 5 · BASIC LENS DATA | | | |
|---|---|---|---|---|
| Si (SURFACE NO.) | Ri (RADIUS OF CURVATURE) | Di (SURFACE SPACING) | Ndi (REFRACTIVE INDEX) | νdj (ABBE NUMBER) |
| G1 { 1 | 41.2693 | 0.81 | 1.92286 | 20.9 |
| 2 | 24.3002 | 2.81 | 1.61800 | 63.3 |
| 3 | -2578.9777 | 0.10 | 1.00000 | |
| 4 | 20.0369 | 2.10 | 1.75500 | 52.3 |
| 5 | 52.6857 | D5 (VARIABLE) | 1.00000 | |
| G2 { 6 | 59.1187 | 0.60 | 1.88300 | 40.8 |
| 7 | 4.5880 | 2.17 | 1.00000 | |
| 8 | -19.0121 | 0.55 | 1.81600 | 46.6 |
| 9 | 11.8421 | 0.10 | 1.00000 | |
| 10 | 8.7294 | 1.87 | 1.92286 | 20.9 |
| 11 | -272.9095 | D11 (VARIABLE) | 1.00000 | |
| 12 (APERTURE DIAPHRAGM) | — | D12 (VARIABLE) | 1.00000 | |
| G3 { 13 | 5.3690 | 3.66 | 1.78800 | 47.4 |
| 14 | -7.7723 | 0.50 | 1.90366 | 31.3 |
| 15 | 5.3162 | 0.15 | 1.00000 | |
| *16 | 5.4051 | 1.66 | 1.51530 | 62.8 |
| *17 | -36.4201 | D17 (VARIABLE) | 1.00000 | |
| G4 { *18 | 20.2242 | 1.75 | 1.58038 | 59.5 |
| 19 | -100.0004 | D19 (VARIABLE) | 1.00000 | |
| 20 | ∞ | 0.80 | 1.51680 | 64.2 |
| 21 | ∞ | | 1.00000 | |

(*: ASPHERIC SURFACE) (f=5.15~48.50mm, FNO.=3.37~5.76, 2ω=84.6° ~9.8°)

FIG. 14B

| | EXAMPLE 5 · VARIABLE SURFACE SPACING DATA | | |
|---|---|---|---|
| SURFACE SPACING | WIDE-ANGLE END (f=5.15) | INTERMEDIATE (f=14.91) | TELEPHOTO END (f=48.50) |
| D5 | 0.30 | 7.77 | 17.20 |
| D11 | 8.82 | 4.57 | 0.91 |
| D12 | 4.10 | 0.80 | 0.80 |
| D17 | 3.76 | 7.21 | 14.09 |
| D19 | 6.67 | 10.09 | 3.85 |

FIG. 15

| EXAMPLE 5 · ASPHERIC DATA |||||| 
|---|---|---|---|---|---|
| SUR-FACE NO. | COEFFICIENT |||||
| | K | A3 | A4 | A5 | A6 |
| 16 | 3.144007E+00 | -2.666961E-04 | -1.950345E-03 | -9.583076E-05 | -1.423678E-04 |
| 17 | 8.622288E+00 | -7.019566E-04 | 3.508202E-03 | -1.560016E-03 | 7.856016E-04 |
| 18 | 7.181554E+00 | -6.727352E-04 | 5.992292E-04 | -2.176903E-04 | 4.426792E-05 |
| | A7 | A8 | A9 | A10 | A11 |
| 16 | -7.842913E-05 | 8.878290E-05 | -3.469635E-05 | -6.537844E-06 | 2.284204E-06 |
| 17 | -3.076423E-05 | -7.371990E-05 | 1.779189E-05 | 1.220060E-07 | -2.289628E-07 |
| 18 | -3.141808E-06 | -1.779953E-06 | 4.302646E-07 | 2.730410E-08 | 4.536840E-09 |
| | A12 | A13 | A14 | | |
| 16 | 1.199905E-06 | -1.396143E-07 | -8.122116E-08 | | |
| 17 | 1.335783E-07 | -1.011336E-07 | 2.789094E-08 | | |
| 18 | -2.125445E-09 | -1.200887E-09 | 2.217190E-10 | | |

FIG. 16

| CONDITIONAL EXPRESSION | NO. | EXAMPLE | | | | |
|---|---|---|---|---|---|---|
| | | 1 | 2 | 3 | 4 | 5 |
| 4.0<f1/fw<7.0 | (1) | 5.765 | 5.811 | 5.764 | 5.690 | 5.764 |
| 0.2<X1/ft<0.3 | (2) | 0.272 | 0.257 | 0.261 | 0.251 | 0.272 |
| 0.2<f3/f4<0.5 | (3) | 0.365 | 0.280 | 0.390 | 0.365 | 0.363 |
| 0.0<Dw/ft<0.1 | (4) | 0.084 | 0.091 | 0.090 | 0.082 | 0.085 |
| 1.57<N12<1.65 | (5) | 1.603 | 1.592 | 1.603 | 1.603 | 1.618 |
| 62.0<$\nu$12<70 | (6) | 65.4 | 68.3 | 65.4 | 65.4 | 63.3 |
| 0.4<(Pt-Pw)/fw<0.9 | (7) | 0.822 | 0.608 | 0.722 | 0.709 | 0.816 |
| 0.7<IH/fw<0.9 | (8) | 0.811 | 0.782 | 0.782 | 0.788 | 0.812 |
| 20<$\nu$23<25 | (9) | 20.9 | 20.9 | 20.9 | 20.9 | 20.9 |

EXAMPLE 1 · WIDE-ANGLE END
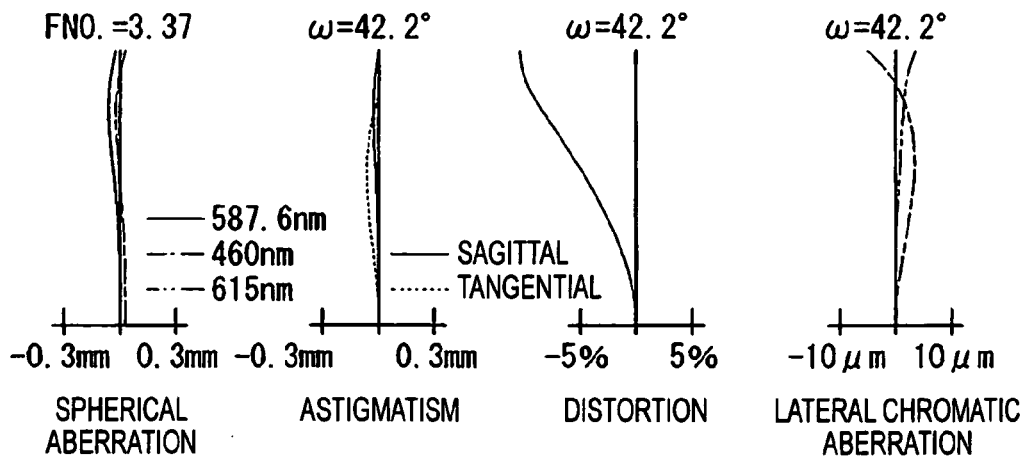
EXAMPLE 1 · INTERMEDIATE
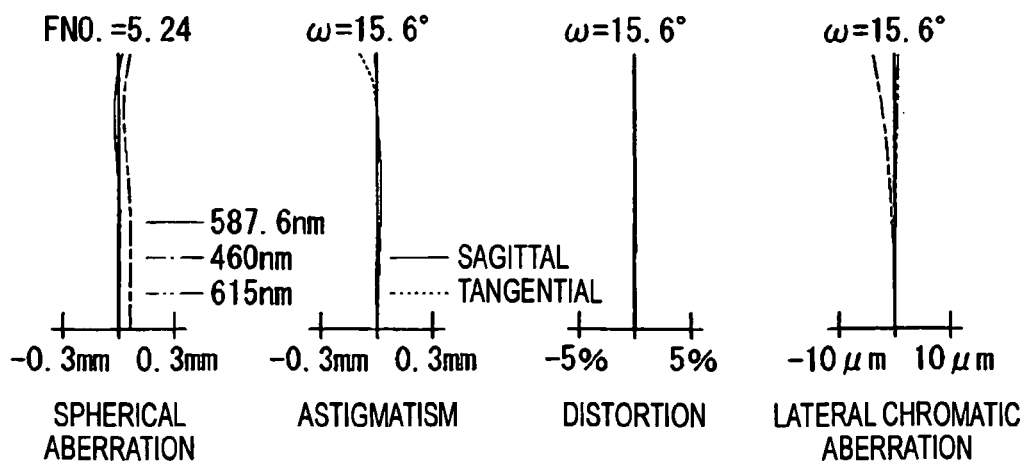

EXAMPLE 1 · TELEPHOTO END

EXAMPLE 2 · WIDE-ANGLE END

EXAMPLE 2 · INTERMEDIATE
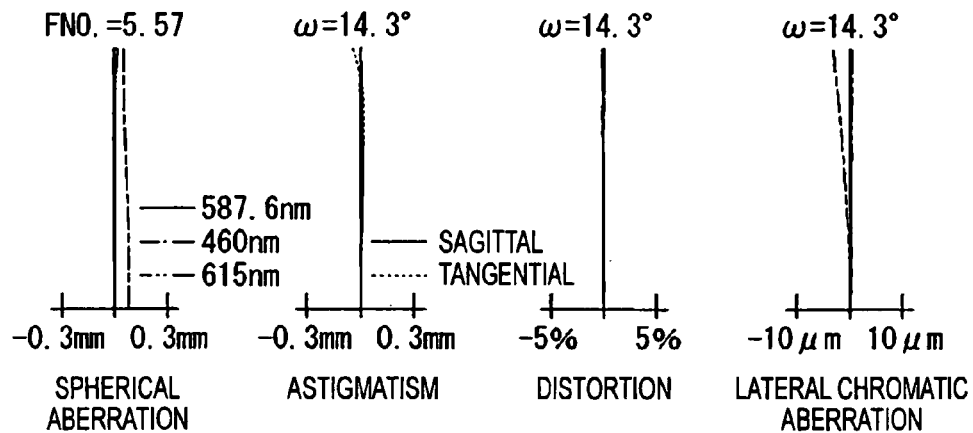
EXAMPLE 2 · TELEPHOTO END
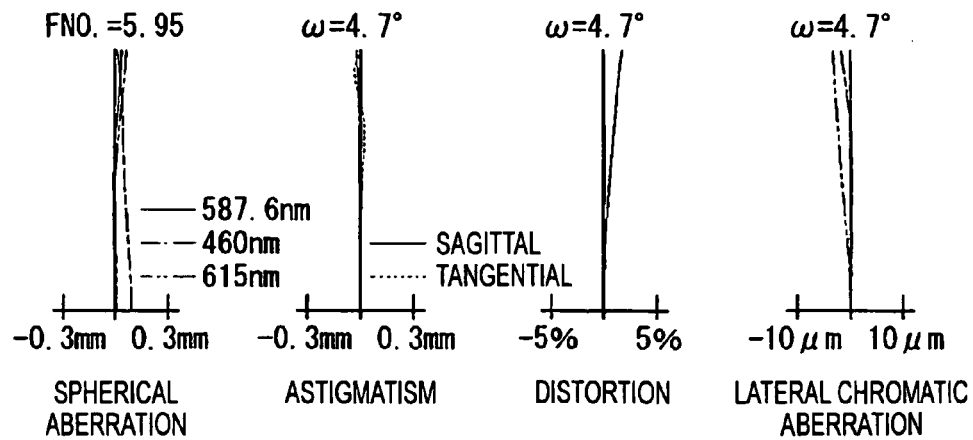

EXAMPLE 3 · WIDE-ANGLE END
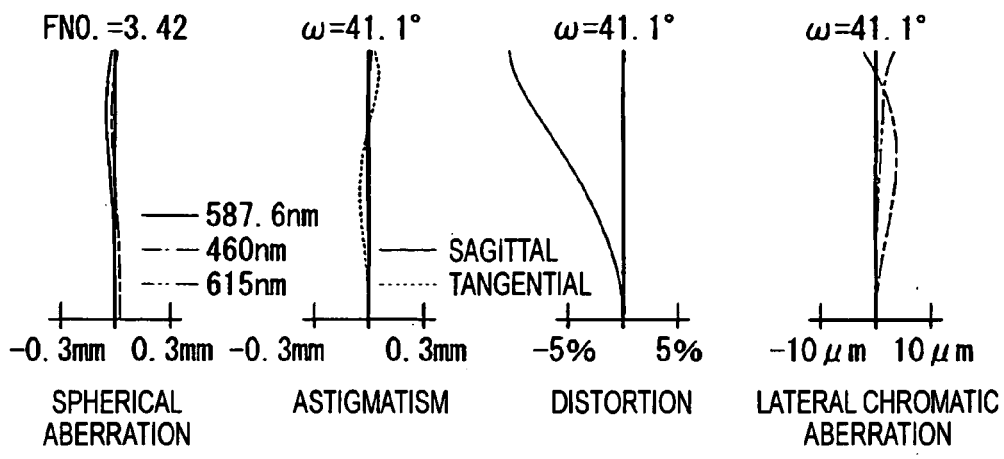
EXAMPLE 3 · INTERMEDIATE
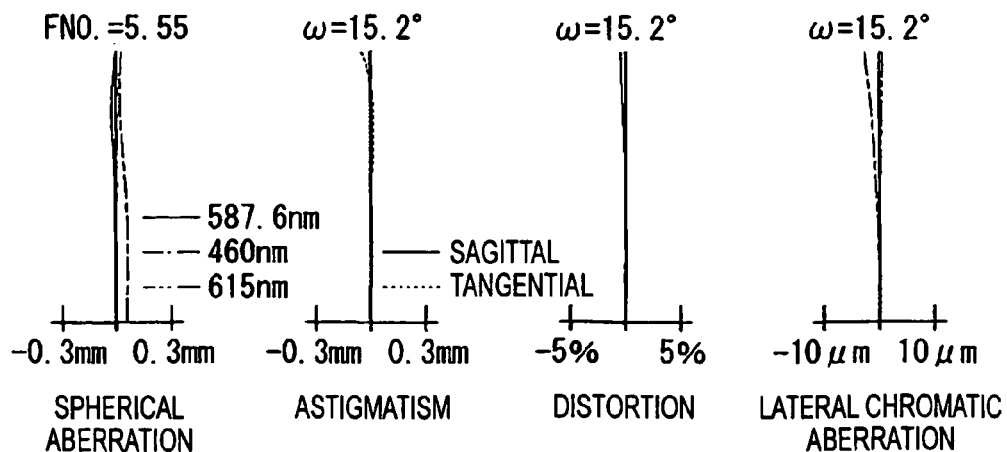

EXAMPLE 3 · TELEPHOTO END
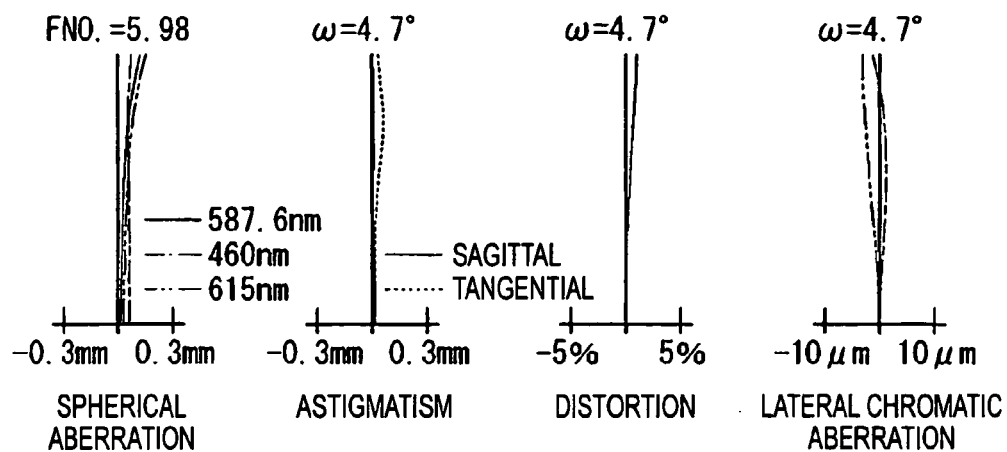
EXAMPLE 4 · WIDE-ANGLE END
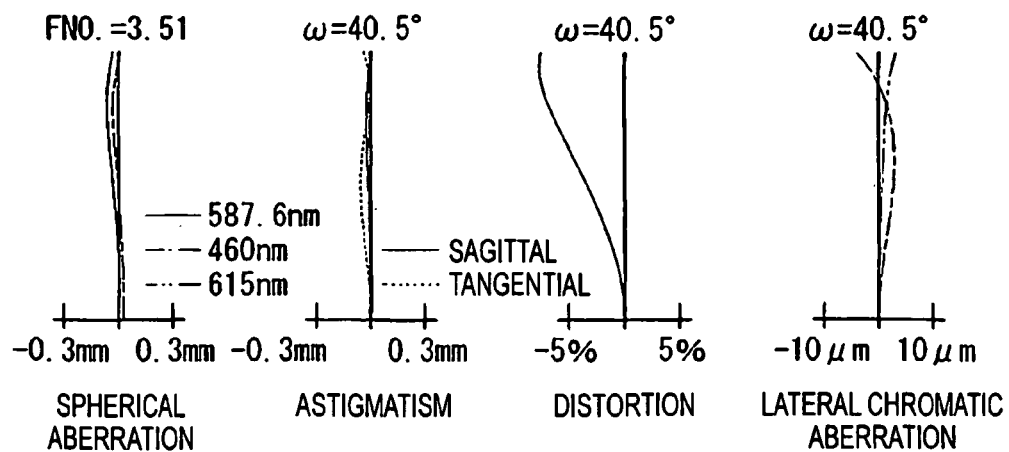

EXAMPLE 4 · INTERMEDIATE
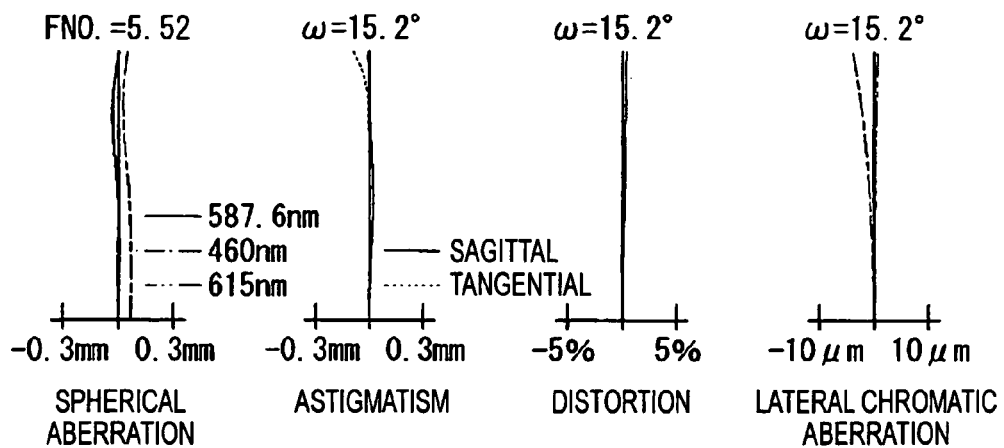
EXAMPLE 4 · TELEPHOTO END
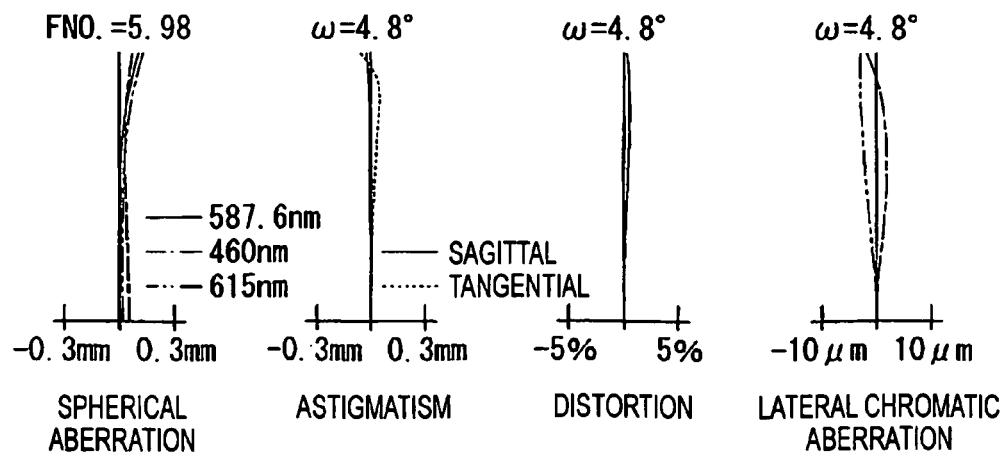

EXAMPLE 5 · WIDE-ANGLE END

EXAMPLE 5 · INTERMEDIATE

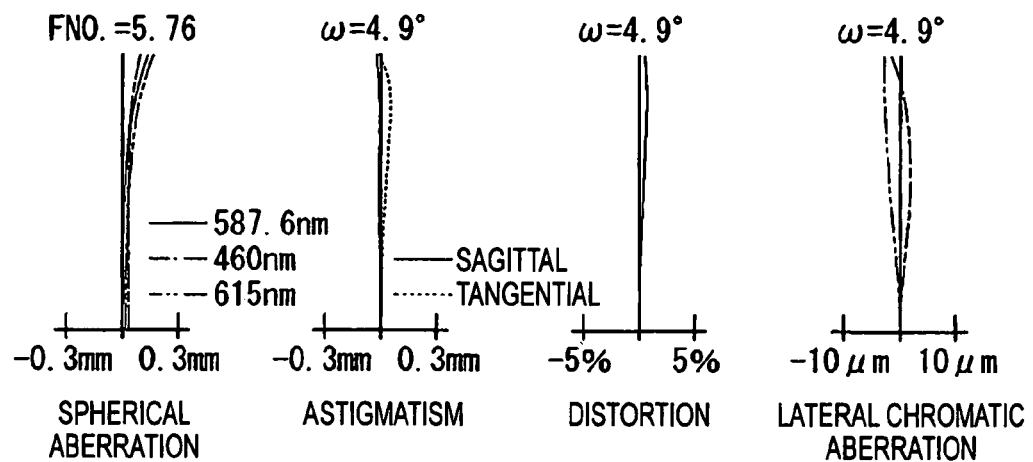

ZOOM LENS AND IMAGING APPARATUS

This application is based on and claims priority under 35 U.S.C §119 from Japanese Patent Application No. 2008-308701, filed on Dec. 3, 2008, the entire disclosure of which is herein incorporated by reference.

BACKGROUND OF THE INVENTION

1. Field of the Invention

The present invention relates to a zoom lens which is suitably used in a video camera, a digital still camera, a personal digital assistance (PDA), or the like, and an imaging apparatus.

2. Description of Related Art

In recent years, the reduction in the size of an imaging device, such as a CCD (Charge Coupled Device) or a CMOS (Complementary Metal Oxide Semiconductor) raises reduction in the size of an imaging apparatus, such as a digital still camera or the like, as a whole. In order to reduce the size of the imaging apparatus as a whole, a lens system should be reduced in size as a whole (the full length and outer diameter of the lens should be reduced).

JP-A-2006-235062, JP-A-2005-215385, Japanese Patent No. 3706783, and Japanese Patent No. 3392881 describe a zoom lens of a four-group configuration including four lens groups having positive, negative, positive, and positive refractive power provided in order from the object side. The zoom lens described in these documents is configured such that the aperture diaphragm is moved independently or together with some of the lens groups during zooming.

The zoom lens described in JP-A-2006-235062 is configured such that the aperture diaphragm is moved independently from adjacent lens groups during zooming. In this case, the travel distance of the aperture diaphragm with respect to the image plane during zooming is comparatively large, so a moving mechanism of an aperture diaphragm is extended, making it difficult to reduce the size of the zoom lens. Further, the focal length of the first lens group is comparatively long, so the full length of the lens is extended, making it difficult to reduce the size of the zoom lens.

The zoom lens described in Japanese Patent No. 3706783 is configured such that the aperture diaphragm is moved together with the third lens group during zooming. In this case, the focal length of the third lens group is the same as that of the fourth lens group, so the displacement of the third lens group during zooming is large, making it difficult to reduce the size of the zoom lens. Further, the focal length of the first lens group is comparatively long, so the full length of the lens is extended, making it difficult to reduce the size of the zoom lens.

The zoom lens described in JP-A-2005-215385 and Japanese Patent No. 3392881 is configured such that the aperture diaphragm is moved to the image side at the telephoto end further than at the wide-angle end during zooming. In this case, the distance between the first lens group and the aperture diaphragm increases during telephoto imaging, and the outer diameter of each lens of the first lens group is expanded, making it difficult to reduce the size of the zoom lens.

SUMMARY OF THE INVENTION

In consideration of the above, an object of the invention is to provide a zoom lens with a high zooming ratio and a reduced size as a whole, and an imaging apparatus.

According to an aspect of the invention, there is provided a zoom lens including, in order from an object side, a first lens group having a positive refractive power, a second lens group having a negative refractive power, a stop, a third lens group having a positive refractive power, and a fourth lens group having a positive refractive power. Zooming is performed by moving at least the first lens group, the second lens group, the stop, and the third lens group along an optical axis. During zooming, the stop is moved so as to be closer to an image plane at a wide-angle end than at a telephoto end and to be closer to the second lens group at the telephoto end than at the wide-angle end. The following conditional expressions are satisfied. For the conditional expressions (1) and (2), fw is a focal length at a wide-angle end of the entire system, ft is a focal length at a telephoto end of the entire system, f1 is a composite focal length of the first lens group, and X1 is a displacement of the first lens group during zooming from the wide-angle end to the telephoto end.

$$4.0 < f1/fw < 7.0 \tag{1}$$

$$0.2 < X1/ft < 0.3 \tag{2}$$

With this zoom lens, the first lens group having a positive refractive power, the second lens group having a negative refractive power, the stop, the third lens group having a positive refractive power, and the fourth lens group having a positive refractive power are provided in order from the object side. Zooming is performed by moving at least the first lens group, the second lens group, the stop, and the third lens group along the optical axis. With this configuration, a high zooming ratio is obtained, and reduction in size as a whole is easily achieved. In particular, appropriate conditional expressions are satisfied, and during zooming, the stop is moved so as to be closer to the image plane at the wide-angle end than at the telephoto end and to be closer to the second lens group at the telephoto end than at the wide-angle end. Therefore, the full length of the lens is suppressed, and the height of rays passing through the first lens group is lowered to suppress the diameter of each lens of the first lens group. As a result, reduction in size as a whole is easily achieved.

The following configuration is further appropriately adopted, so the invention is more advantageous for reduction in size.

The zoom lens may satisfy at least one of the following conditional expressions. For the conditional expressions, f3 is a composite focal length, of the third lens group, f4 is a composite focal length of the fourth lens group, and Dw is a spacing on the optical axis between the stop and a lens surface of the third lens group nearest to the object side at the wide-angle end. Pw is a distance on the optical axis between the stop and the image plane at the wide-angle end, and Pt is a distance on the optical axis between the stop and the image plane at the telephoto end. IH is a maximum image height.

$$0.2 < f3/f4 < 0.5 \tag{3}$$

$$0.0 < Dw/ft < 0.1 \tag{4}$$

$$0.4 < (Pt-Pw)/fw < 0.9 \tag{7}$$

$$0.7 < IH/fw < 0.9 \tag{8}$$

In the zoom lens, the first lens group may include, in order from the object side, a cemented lens having a negative meniscus lens having a convex surface on the object side and a positive lens having a convex surface on the object side, and a positive meniscus lens having a convex surface on the object side. In this case, the following conditional expressions may be satisfied. For the conditional expressions (5) and (6), N12 is a refractive index of the positive lens constituting the cemented lens in the first lens group at the d-line, and v12 is an Abbe number of the positive lens constituting the cemented lens in the first lens group at the d-line.

$$1.57 < N12 < 1.65 \quad (5)$$

$$62.0 < v12 < 70 \quad (6)$$

The second lens group may include, in order from the object side, a negative lens where an image-side surface thereof is a concave surface having a radius of curvature whose absolute value is smaller than that of an object-side surface thereof, a biconcave lens, and a positive lens having a convex surface on the object side. The lenses may not be cemented to each other. In this case, the following conditional expression may be satisfied. For the conditional expression (9), v23 is an Abbe number of the positive lens in the second lens group at the d-line.

$$20 < v23 < 25 \quad (9)$$

The third lens group may include, in order from the object side, a cemented lens having a positive lens where an object-side surface thereof is a convex surface having a radius of curvature whose absolute value is smaller than that of an image-side surface thereof and a negative lens having a concave surface on the image side, and a single lens where at least one surface is aspheric.

The fourth lens group may include one positive lens, and at least one surface of the positive lens may be aspheric. The fourth lens group may be moved during focusing.

Another aspect of the invention provides an imaging apparatus. The imaging apparatus includes the above-described zoom lens, and an imaging device outputting an imaging signal according to an optical image formed by the room lens.

With this imaging apparatus, a high-performance zoom lens with a reduced size is used as an imaging lens, so reduction in size as a whole is achieved.

BRIEF DESCRIPTION OF THE DRAWINGS

The features of the invention will appear more fully upon consideration of the exemplary embodiment of the invention, which are schematically set forth in the drawings, in which:

FIGS. 6A and 6B are diagrams showing lens data of the zoom lens according to Example 1, specifically, FIG. 6A shows basic lens data, and FIG. 6B shows data of an on-axis surface spacing of a portion moving in accordance with zooming;

FIG. 7 is a diagram showing data regarding an aspheric surface of the zoom lens according to Example 1;

FIGS. 5A and 8B are diagrams showing lens data of the zoom lens according to Example 2, specifically, FIG. 5A shows basic lens data, and FIG. 5B shows data of an on-axis surface spacing of a portion moving in accordance with zooming;

FIG. 9 is a diagram showing data regarding an aspheric surface of the zoom lens according to Example 2;

FIGS. 10A and 10B are diagrams showing lens data of the zoom lens according to Example 3, specifically, FIG. 10A shows basic lens data, and FIG. 10B shows data of an on-axis surface spacing of a portion moving in accordance with zooming;

FIG. 11 is a diagram showing data regarding an aspheric surface of the zoom lens according to Example 3;

FIGS. 12A and 12B are diagrams showing lens data of the zoom lens according to Example 4, specifically, FIG. 12A shows basic lens data, and FIG. 12B shows data of an on-axis surface spacing of a portion moving in accordance with zooming;

FIG. 13 is a diagram showing data regarding an aspheric surface of the zoom lens according to Example 4;

FIGS. 14A and 14B are diagrams showing lens data of the zoom lens according to Example 5, specifically, FIG. 14A shows basic lens data, and FIG. 14B shows data of an on-axis surface spacing of a portion moving in accordance with zooming;

FIG. 15 is a diagram showing data regarding an aspheric surface of the zoom lens according to Example 5;

FIG. 16 is a diagram collectively showing values regarding conditional expressions for respective examples;

FIGS. 17A to 17D are aberration diagrams showing aberrations at a wide-angle end in the zoom lens according to Example 1, specifically, FIG. 17A shows spherical aberration, FIG. 17B shows astigmatism, FIG. 17C shows distortion, and FIG. 17D shows lateral chromatic aberration;

FIGS. 18A to 18D are aberration diagrams showing aberrations at an intermediate area in the zoom lens according to Example 1, specifically, FIG. 18A shows spherical aberration, FIG. 18B shows astigmatism, FIG. 18C shows distortion, and FIG. 18D shows lateral chromatic aberration;

FIG. 19A shows spherical aberration, FIG. 19B shows astigmatism, FIG. 19C shows distortion, and FIG. 19D shows lateral chromatic aberration;

FIG. 20A shows spherical aberration, FIG. 20B shows astigmatism, FIG. 20C shows distortion, and FIG. 20D shows lateral chromatic aberration;

FIGS. 21A to 21D are aberration diagrams showing aberrations at an intermediate area in the zoom lens according to Example 2, specifically, FIG. 21A shows spherical aberration, FIG. 21B shows astigmatism, FIG. 21C shows distortion, and FIG. 21D shows lateral chromatic aberration;

FIGS. 22A to 22D are aberration diagrams showing aberrations at a telephoto end in the zoom lens according to Example 2, specifically, FIG. 22A shows spherical aberration, FIG. 22B shows astigmatism, FIG. 22C shows distortion, and FIG. 22D shows lateral chromatic aberration;

FIGS. 23A to 23D are aberration diagrams showing aberrations at a wide-angle end in the zoom lens according to Example 3, specifically, FIG. 23A shows spherical aberration, FIG. 23B shows astigmatism, FIG. 23C shows distortion, and FIG. 23D shows lateral chromatic aberration;

FIGS. 24A to 24D are aberration diagrams showing aberrations at an intermediate area in the zoom lens according to Example 3, specifically, FIG. 24A shows spherical aberration, FIG. 24B shows astigmatism, FIG. 24C shows distortion, and FIG. 24D shows lateral chromatic aberration;

FIGS. 25A to 25D are aberration diagrams showing aberrations at a telephoto end in the zoom lens according to Example 3, specifically, FIG. 25A shows spherical aberration, FIG. 25B shows astigmatism, FIG. 25C shows distortion, and FIG. 25D shows lateral chromatic aberration;

FIGS. 26A to 26D are aberration diagrams showing aberrations at a wide-angle end in the zoom lens according to Example 4, specifically, FIG. 26A shows spherical aberration, FIG. 26B shows astigmatism, FIG. 26C shows distortion, and FIG. 26D shows lateral chromatic aberration;

FIGS. 27A to 27D are aberration diagrams showing aberrations at an intermediate area in the zoom lens according to Example 4, specifically, FIG. 27A shows spherical aberration, FIG. 27B shows astigmatism, FIG. 27C shows distortion, and FIG. 27D shows lateral chromatic aberration;

FIGS. 28A to 28D are aberration diagrams showing aberrations at a telephoto end in the zoom lens according to Example 4, specifically, FIG. 28A shows spherical aberration, FIG. 28B shows astigmatism, FIG. 28C shows distortion, and FIG. 28D shows lateral chromatic aberration;

FIG. 29A shows spherical aberration, FIG. 29B shows astigmatism, FIG. 29C shows distortion, and FIG. 29D shows lateral chromatic aberration;

FIG. 30A shows spherical aberration, FIG. 30B shows astigmatism, FIG. 30C shows distortion, and FIG. 30D shows lateral chromatic aberration;

FIGS. 31A to 31D are aberration diagrams showing aberrations at a telephoto end in the zoom lens according to Example 5, specifically, FIG. 31A shows spherical aberration, FIG. 31B shows astigmatism, FIG. 31C shows distortion, and FIG. 31D shows lateral chromatic aberration;

DETAILED DESCRIPTION OF THE EXEMPLARY EMBODIMENTS

With the zoom lens according to an exemplary embodiment of the invention, the first lens group having positive refractive power, the second lens group having negative refractive power, the stop, the third lens group having positive refractive power, and the fourth lens group having positive refractive power are provided in order from the object side, and during zooming, the movements of the lens groups and the stop are optimized in combination with appropriate conditional expressions. Therefore, a high zooming ratio can be obtained, and reduction in size as a whole can be achieved.

With the imaging apparatus according to another exemplary embodiment of the invention, a high-performance zoom lens with a reduced size is used as an imaging lens, so reduction in size as a whole can be achieved while good imaging performance at a high zooming ratio can be maintained.

Hereinafter, an exemplary embodiment of the invention will be described in detail with reference to the drawings.

Figure 1A:
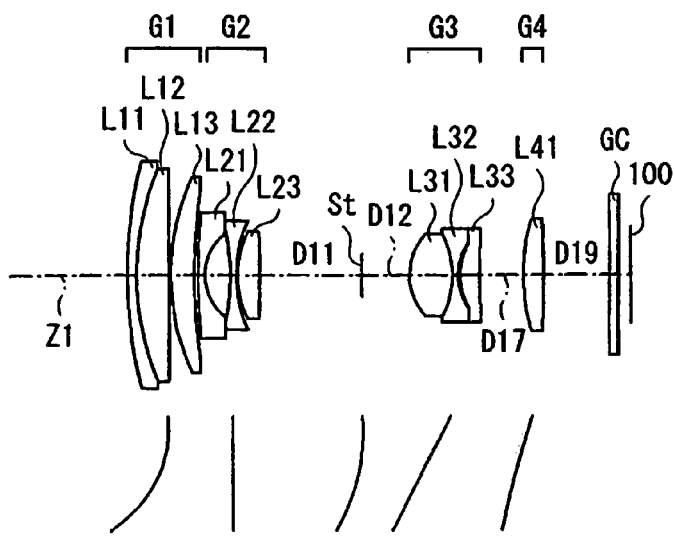
FIGS. 1A to 1C are lens sectional views corresponding to Example 1, showing a first configuration example of a zoom lens according to an exemplary embodiment of the invention.
Figure 1B:
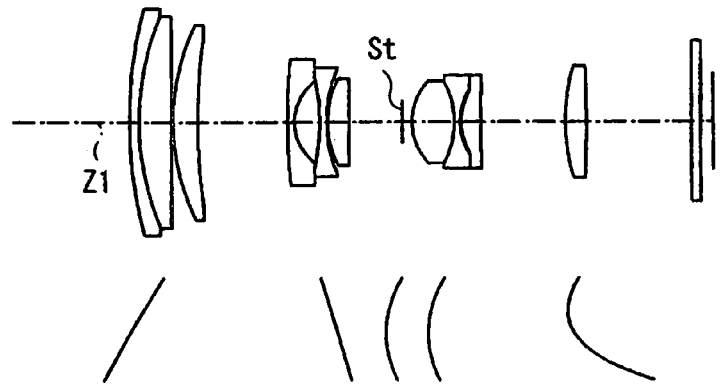
Figure 1C:
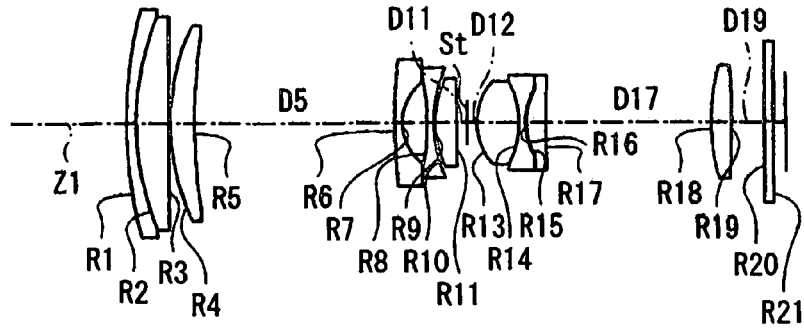

FIGS. 1A, 1B, and 1C show a first configuration example of a zoom lens according to an embodiment of the invention. This configuration example corresponds to the lens configuration of a first numerical example (FIGS. 6A, 6B, and 7) described below. FIG. 1A shows the optical arrangement at a wide-angle end (smallest focal length state). FIG. 1B shows the optical arrangement in an intermediate area (intermediate focal length state). FIG. 1C corresponds to the optical arrangement at a telephoto end (largest focal length state). Similarly, FIGS. 2A, 2B, and 2C to FIGS. 5A, 5B, and 5C show the sectional configuration of second to fifth configuration examples corresponding to the lens configuration of second to fifth numerical examples described below, In FIGS. 1A, 1B, and 1C to FIGS. 5A, 5B, and 5C, Ri indicates a radius of curvature of an i-th surface where the number i sequentially increases as it gets closer to the image side (imaging side) when a surface of a component nearest to the object side is defined as a first surface. Di indicates a surface spacing on an optical axis Z1 between the i-th surface and the (i+1)th surface. With regard to Di, only portions which are changed in accordance with zooming are marked with on-axis surface spacings D5, D11, D12, D17, and D19. The respective configuration examples have the same basic configuration, so description will be provided on the basis of the first configuration example shown in FIGS. 1A, 1B, and 1C.

The zoom lens includes, in order from the object side along the optical axis Z1, a first lens group G1, a second lens group G2, a third lens group G3, and a fourth lens group G4. An optical aperture diaphragm St is arranged between the second lens group G2 and the third lens group G3.

The zoom lens is mountable on a personal digital assistant (PDA) as well as imaging equipment, such as a video camera, a digital still camera, or the like. A member is arranged on the image side of the zoom lens in accordance with the configuration of a photographing section of a camera on which the zoom lens is mounted. For example, an imaging device 100, such as a CCD (Charge Coupled Device) or a CMOS (Complementary Metal Oxide Semiconductor), is arranged on the imaging surface of the zoom lens. The imaging device 100 outputs an imaging signal according to an optical image formed by the zoom lens. The imaging apparatus of this embodiment includes at least the zoom lens and the imaging device 100. Various optical members GC may be arranged between the last lens group (fourth lens group G4) and the imaging device 100 in accordance with the configuration of a camera on which the lens is mounted. For example, a flat plate-shaped optical member, such as cover glass for protecting the imaging surface or an infrared cut filter, may be arranged.

Figure 32A:
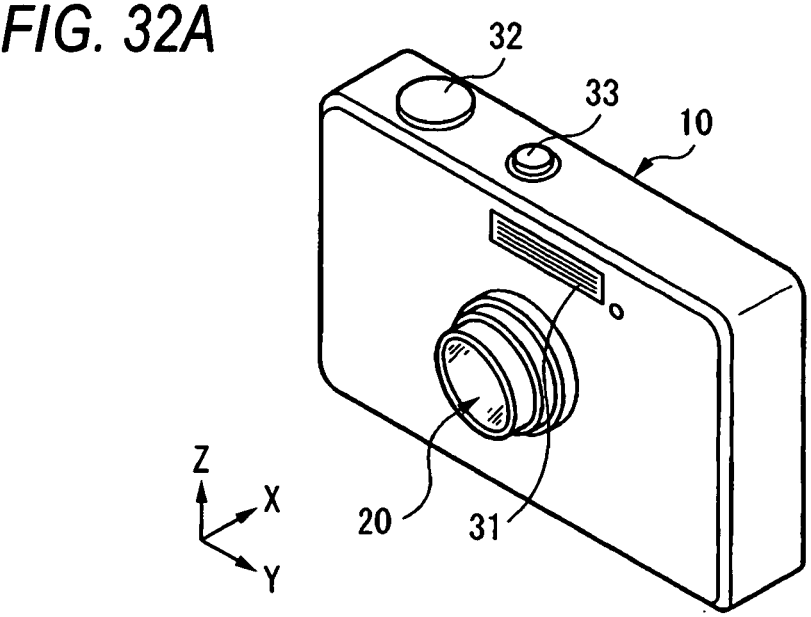
FIGS. 32A and 32B are appearance views showing a configuration example of a digital still camera as an imaging apparatus according to an embodiment of the invention.
Figure 32B:
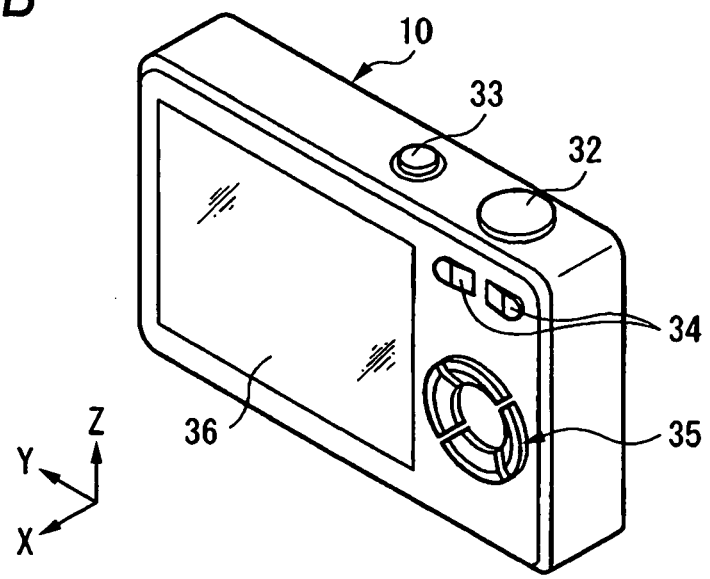

FIGS. 32A and 32B show a digital still camera as an example of the imaging apparatus of this embodiment. Specifically, FIG. 32A shows the appearance of the digital still camera when viewed from the front side. FIG. 32B shows the appearance of the digital still camera when viewed from the rear side. The digital still camera includes a camera main body 10, and an electronic flash light emitting section 31 is provided at the central upper part on the front surface of the camera main body 10 so as to irradiate electronic flash light. A release button 32 and a power button 33 are provided at the upper surface of the camera main body 10. A display section 36 and operating sections 34 and 35 are provided at the rear surface of the camera main body 10. The display section 36 is used to display a captured image. A photographing opening to which light from an object to be photographed is input is provided at the central portion on the front surface of the camera main body 10, and a lens section 20 is provided at a position corresponding to the photographing opening. The lens section 20 is configured such that a lens member is housed in a retractable lens barrel. In the camera main body 10 are provided an imaging device, such as a CCD or the like, which outputs an imaging signal according to a subject image formed by the lens section 20, a signal processing circuit which process the imaging signal output from the imaging device to generate an image, a recording medium for recording the generated image, and the like. In this digital still camera, still images for one frame are photographed by press operation of the release button 32, and image data obtained by photographing is recorded in the recording medium (not shown) of the camera main body 10. In such a camera, if the zoom lens of this embodiment is used as the lens section 20, a high-resolution imaging signal is obtained. In the camera main body 10, a high-resolution image can be generated on the basis of the imaging signal.

Figure 33:
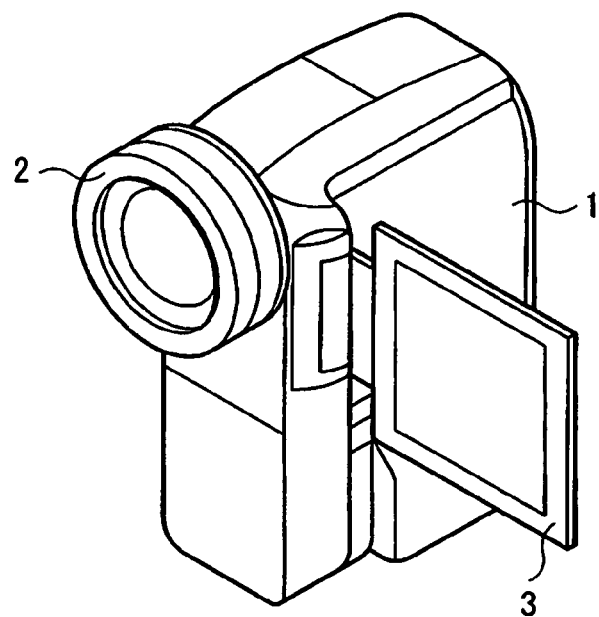
FIG. 33 is an appearance view showing a configuration example of a video camera as an imaging apparatus according to an embodiment of the invention.

FIG. 33 shows a configuration example of a video camera as an example of an imaging apparatus on which the zoom lens is mounted. This video camera includes a camera main body 1, and a camera lens 2 provided at the upper part of the camera main body 1. In the camera main body 1 are provided an imaging device 100, such as a CCD or the like, which outputs an imaging signal according to a subject image formed by the camera lens 2, a signal processing circuit which processes the imaging signal output from the imaging device 100 to generate an image, a recording medium for recording the generated image, and the like. A display unit 3 for displaying a photographed image is also attached to the camera main body 1. In such a video camera, the zoom lens of this embodiment can be used as the camera lens 2.

In this embodiment, the zoom lens is suitable for an imaging apparatus having an enormous number of pixels equal to or larger than 10 million pixels, in particular, about 12 to 16 million pixels.

The zoom lens is configured such that zooming is performed by moving at least the first lens group G1, the second lens group G2, the aperture diaphragm St, and the third lens group G3 along the optical axis. During zooming, the fourth lens group G4 may be moved. Further, the fourth lens group G4 may be moved during focusing. Many lens groups are moved, so the burden imposed on the respective lens groups for zooming or image plane correction can be reduced, as compared with a case where several lens groups are moved.

Specifically, the respective lens groups and the aperture diaphragm St are moved from the state of FIG. 1A to the state of FIG. 1B and further to the state of FIG. 1C so as to follow a trajectory indicated by a solid line in the drawing in accordance with zooming from the wide-angle end to the intermediate area and further to the telephoto end. In particular, the aperture diaphragm St is moved so as to be closer to the image plane at the wide-angle end than at the telephoto end and to be closer to the second lens group G2 at the telephoto end than at the wide-angle end. The respective lens groups and the aperture diaphragm St are moved such that the spacing on the optical axis between the aperture diaphragm St and the third lens group G3 becomes larger at the wide-angle end than at the telephoto end. The fourth lens group G4 may be moved so as to be closer to the image plane at the telephoto end than at the wide-angle end during zooming.

The first lens group G1 has positive refractive power as a whole. The first lens group G1 may include, for example, three lenses. Specifically, the first lens group G1 preferably includes, in order from the object side, a cemented lens having a negative lens L11 having a meniscus shape with a convex surface on the object side and a positive lens L12 having a convex surface on the object side, and a positive lens L13 having a meniscus shape with a convex surface on the object side.

The second lens group G2 has negative refractive power as a whole. The second lens group G2 may include, for example, three lenses. Specifically, the second lens group G2 preferably includes, in order from the object side, a negative lens L21 where an image-side surface thereof is a strong concave surface (a concave surface having a radius of curvature whose absolute value is smaller than that of an object-side surface), a biconcave lens L22, and a positive lens L23 having a convex surface on the object side. It is preferable that these lenses are not cemented to each other.

The third lens group G3 has positive refractive power as a whole. The third lens group G3 may include, for example, three lenses. Specifically, the third lens group G3 preferably includes, in order from the object side, a cemented lens having a positive lens L31 where an object-side surface is a strong convex surface (a convex surface having a radius of curvature whose absolute value is smaller than that of an image-side surface) and a negative lens L32 having a concave surface on the image side, and a single lens L33 where at least one surface is aspheric.

The fourth lens group G4 has positive refractive power as a whole. The fourth lens group G4 preferably includes one positive lens L41. The positive lens L41 is preferably configured such that at least one surface is aspheric.

This zoom lens is preferably configured so as to appropriately and selectively satisfy the following conditional expressions. For the conditional expressions (1) to (4), fw is a focal length at the wide-angle end of the entire system, ft is a focal length at the telephoto end of the entire system, f1 is a composite focal length of the first lens group G1, and X1 is a displacement of the first lens group G1 during zooming from the wide-angle end to the telephoto end. f3 is a composite focal length of the third lens group G3, f4 is a composite focal length of the fourth lens group G4, and Dw is a spacing on the optical axis between the aperture diaphragm St and a lens surface of the third lens group G3 nearest to the object side at the wide-angle end.

$$4.0 < f1/fw < 7.0 \tag{1}$$

$$0.2 < X1/ft < 0.3 \tag{2}$$

$$0.2 < f3/f4 < 0.5 \tag{3}$$

$$0.0 < Dw/ft < 0.1 \tag{4}$$

The positive lens L12 constituting the cemented lens in the first lens group G1 preferably satisfies the following conditional expressions. For the conditional expressions (5) and (6), N12 is a refractive index of the positive lens L12 at the d-line, and v12 is an Abbe number of the positive lens L12 at the d-line.

$$1.57 < N12 < 1.65 \tag{5}$$

$$62.0 < v12 < 70 \tag{6}$$

It is preferable that the following conditional expressions are appropriately and selectively satisfied. For the conditional expressions (7) and (8), Pw is a distance on the optical axis between the aperture diaphragm St and the image plane at the wide-angle end, and Pt is a distance on the optical axis between the aperture diaphragm St and the image plane at the telephoto end. IH is a maximum image height.

$$0.4 < (Pt-Pw)/fw < 0.9 \tag{7}$$

$$0.7 < IH/fw < 0.9 \tag{8}$$

The positive lens L23 in the second lens group G2 preferably satisfies the following conditional expression. For the conditional expression (9), v23 is an Abbe number of the positive lens L23 at the d-line.

$$20 < v23 < 25 \tag{9}$$

Next, the operation and advantages of the zoom lens configured as above will be described.

This zoom lens includes, in order from the object side, the first lens group G1 having positive refractive power, the second lens group G2 having negative refractive power, the aperture diaphragm St, the third lens group G3 having positive refractive power, and the fourth lens group G4 having positive refractive power. With this configuration, zooming is performed by moving at least the first lens group G1, the second lens group G2, the aperture diaphragm St, and the third lens group G3 along the optical axis Z1. Therefore, a high zooming ratio is obtained, and reduction in size as a whole is easily achieved. In particular, appropriate conditional expressions are satisfied, and during zooming, the aperture diaphragm St is moved so as to be closer to the image plane at the wide-angle end than at the telephoto end and to be closer to the second lens group G2 at the telephoto end than at the wide-angle end. Therefore, the full length of the lens is suppressed, and the height of rays passing through the first lens group G1 is lowered to suppress the diameter of each lens of the first lens group G1. As a result, reduction in size as a whole is easily achieved.

The cemented lens having the negative lens L11 and the positive lens L12 is used in the first lens group G1, so longitudinal chromatic aberration can be corrected, and in particular, longitudinal chromatic aberration at the telephoto end can be reduced. The positive lens L13 having a convex surface on the object side is arranged, such that field curvature and distortion can be corrected.

The second lens group G2 includes, in order from the object side, the negative lens L21 where the image-side surface is a strong concave surface, the biconcave lens L22, and the positive lens L23 having a convex surface on the object side, and these lenses are not cemented to each other. Therefore, changes in the aberrations can be suppressed over the entire zooming area. Specifically, the following operation and advantages are obtained by the second lens group G2. In this zoom lens, if the full length of the lens is shortened, the refractive power of the second lens group G2 becomes strong, and significant changes in the aberrations are likely to occur during zooming. Therefore, if the second lens group G2 includes three lenses which are not cemented to each other, the degree of freedom for design increases and design with small changes in the aberrations is possible, as compared with a case where the lenses are cemented to each other. The negative lens L21 and the biconcave lens L22 are arranged in order from the object side, such that field curvature and distortion can be corrected. The positive lens L23 is arranged, such that lateral chromatic aberration at the wide-angle end and longitudinal chromatic aberration at the telephoto end can be satisfactorily corrected.

The third lens group G3 includes, in order from the object side, the cemented lens having the positive lens L31 where an object-side surface is a strong convex surface and the negative lens L32 having a concave surface on the image side, and the single lens L33 where at least one surface is aspheric. Therefore, aberrations at the wide-angle end with an increasing distance from the aperture diaphragm St, not at the telephoto end, can be corrected. Specifically, the following operation and advantages are obtained by the third lens group G3. In this zoom lens, the aperture diaphragm St is away from the third lens group G3 at the wide-angle end farther than at the telephoto end, and the height of rays at the wide-angle end is increased higher than at the telephoto end. For this reason, field curvature and distortion are likely to increase at the wide-angle end. For this reason, if the single lens L33 having an aspheric shape is arranged on the image side of the positive lens L31 and the negative lens L32, field curvature and distortion at the wide-angle end can be corrected, and spherical aberration can also be corrected. The positive lens L31 and the negative lens L32 are cemented to each other, such that longitudinal chromatic aberration can be corrected.

During zooming, the fourth lens group G4 is moved so as to be closer to the image plane at the telephoto end than at the wide-angle end, so a high zooming ratio can be obtained and the full length of the lens can be shortened. The fourth lens group G4 is moved during focusing, such that high-speed focusing can be achieved. Specifically, the following operation and advantages are obtained by the fourth lens group G4. If the fourth lens group G4 is moved during zooming so as to be closer to the image plane at the telephoto and than at the wide-angle end, the interval between the third lens group G3 and the fourth lens group G4 can be increased at the telephoto end further than at the wide-angle end, making it easy to achieve a high zooming ratio. The image plane displacement during near-point photographing at the telephoto end is larger than that at the wide-angle end, and the displacement of a lens which is moved during focusing is increased at the telephoto end further than at the wide-angle end. When the fourth lens group G4 is used during focusing, the fourth lens group G4 is moved so as to be closer to the image plane of the telephoto end than at the wide-angle end, so the position of the fourth lens group G4 at the telephoto end during near-point photographing can come close to the position of the fourth lens group G4 at the wide-angle end. When the fourth lens group G4 is driven by a motor, the displacement of the fourth lens group G4 during zooming and focusing can be suppressed over the entire zooming area from the wide-angle end to the telephoto end. A guide supporting the frame of the fourth lens group G4 is reduced in length, so the lens length during retraction can be shortened.

The fourth lens group G4 includes one positive lens L41, such that low-cost and reduction in size can be achieved. The weight of a lens which is moved during focusing can be reduced, enabling high-speed focusing. At least one surface of the positive lens 141 is aspheric, so field curvature can be corrected and the full length of the lens can be reduced.

The conditional expression (1) relates to the focal length f1 of the first lens group G1, and if this conditional expression is satisfied, the optical system can be reduced in size and aberrations over the entire zooming area can be satisfactorily corrected. If the value f1/fw is smaller than the lower limit of the conditional expression (1), the refractive power of the first lens group G1 increases, so it is advantageous to reduce the size of the optical system. In this case, however, there is an increase in aberrations of the first lens group G1, making it difficult to satisfactorily correct aberrations over the entire zooming area. If the value f1/fw is larger than the upper limit, the refractive power of the first lens group G1 decreases. For this reason, the full length of the lens is extended, and the outer diameter of the first lens group G1 is expanded, making it impossible to reduce the size of the optical system.

The conditional expression (2) relates to the displacement of the first lens group G1 from the wide-angle end to the telephoto end. If this conditional expression is satisfied, the optical system can be reduced in size. If the value X1/ft is smaller than the lower limit of the conditional expression (2), the displacement of the first lens group G1 decreases, so the length of the moving mechanism of the first lens group G1 is shortened. In this case, however, the full length of the lens at the telephoto end is extended, making it impossible to reduce the size of the optical system. If the value X1/ft is larger than the upper limit, the displacement of the first lens group G1 increases, so it is advantageous to shorten the full length of the lens at the telephoto end. Meanwhile, the moving mechanism of the first lens group G1 is extended, making it impossible to reduce the size of the optical system during retraction.

The conditional expression (3) relates to the focal lengths of the third lens group G3 and the fourth lens group G4. If this conditional expression is satisfied, the optical system can be reduced in size and the entrance angle of rays to the imaging device can be reduced. If the value f3/f4 is smaller than the lower limit of the conditional expression (3), the refractive power of the third lens group G3 increases, so the full length of the lens is shortened. In this case, however, the refractive power of the fourth lens group G4 decreases, so the entrance angle of rays to the imaging device increases and shading is likely to be influenced. If the value f3/f4 is larger than the upper limit, the refractive power of the fourth lens group G4 increases, so the entrance angle to the imaging device is reduced and there is no influence on shading. Meanwhile, the refractive power of the third lens group G3 decreases, so the full length of the lens is extended, making it difficult to achieve reduction in size.

The conditional expression (4) relates to the on-axis spacing between the aperture diaphragm St and the third lens group G3 at the wide-angle end. If this conditional expression is satisfied, the optical system can be reduced in size. If the value Dw/ft is smaller than the lower limit of the conditional expression (4), at the wide-angle end, the distance between the aperture diaphragm St and the third lens group G3 is shortened, but the distance between the aperture diaphragm St and the first lens group G1 increases and also the distance between the aperture diaphragm St and the second lens group G2 increases. Accordingly, the effective range of rays in the first lens group G1 increases, making it difficult to reduce the outer diameter of the lens. If the value Dw/ft is larger than the upper limit, the distance between the aperture diaphragm St and the third lens group G3 increases at the wide-angle end, so the effective range of rays in the third lens group G3 increases. For this reason, when the third lens group G3 is retracted during retraction, the outer diameter of the lens barrel increases during retraction.

The conditional expressions (5) and (6) relate to the lens material of the positive lens L12 in the first lens group G1. If this conditional expression is satisfied, optical performance over the entire zooming area can be satisfactorily corrected. If the value N12 is smaller than the lower limit of the conditional expression (5), Petzval sum increases, and field curvature at the telephoto end increases. If the value N12 is larger than the upper limit of the conditional expression (5), the critical angle regarding the full reflection condition decreases on the image-side surface of the positive lens L12. For this reason, full reflection is likely to occur and stray light is likely to occur. If the value v12 is smaller than the lower limit of the conditional expression (6), longitudinal chromatic aberration at the telephoto end increases. If the value v12 is larger than the upper limit, lateral chromatic aberration at the wide-angle end increases.

The conditional expression (7) relates to the travel distance of the aperture diaphragm during zooming. If this conditional expression is satisfied, the outer diameter of each lens in the first lens group G1 can be reduced, and the lens length during retraction can be shortened. If the value (Pt−Pw)/fw is smaller than the conditional expression (7), the displacement of the aperture diaphragm St during zooming decreases, so the length of the moving mechanism of the aperture diaphragm can be shortened. In this case, however, the effective range of rays in the first lens group G1 increases, making it difficult to reduce the outer diameter of the lens. If the value (Pt−Pw)/fw is larger than the upper limit, the effective range of rays in the first lens group G1 decreases, so it is advantageous to reduce the outer diameter of the lens. Meanwhile, the length of the moving mechanism of the aperture diaphragm is extended, making it difficult to shorten the lens length during retraction.

The conditional expression (8) relates to the maximum angle of view at the wide-angle end. If this conditional expression is satisfied, photographing is possible at a wide angle of view.

The conditional expression (9) relates to the Abbe number of the positive lens L23 in the second lens group G2. If this conditional expression is satisfied, chromatic aberration can be satisfactorily corrected. If the value v23 is smaller than the lower limit of the conditional expression (9), longitudinal chromatic aberration increases at the telephoto end. If the value v23 is larger than the upper limit, lateral chromatic aberration increases at the telephoto end.

As described above, according to the zoom lens of this embodiment, the first lens group G1 having positive refractive power, the second lens group G2 having negative refractive power, the aperture diaphragm St, the third lens group G3 having positive refractive power, and the fourth lens group G4 having positive refractive power are provided in order from the object side. With this configuration, during zooming, the movements of the respective lens groups and the aperture diaphragm St are optimized in combination with appropriate conditional expressions. Therefore, a high zooming ratio can be obtained, and reduction in size as a whole can be achieved, According to the imaging apparatus having the zoom lens of this embodiment mounted therein, the apparatus can be reduced in size as a whole while good imaging performance with a high zooming ratio can be maintained.

EXAMPLES

Next, specific numerical examples of the zoom lens of this embodiment will be described. Hereinafter, a plurality of numerical examples will be collectively described.

FIGS. 6A, 6B, and 7 show specific lens data corresponding to the configuration of the zoom lens shown in FIGS. 1A, 1B, and 1C. In particular, FIG. 6A shows basic lens data, and FIGS. 6B and 7 show other kinds of data. With regard to lens data shown in FIG. 6A, the column of surface number Si shows the number of the i-th (where i=1 to 21) surface of the zoom lens according to Example 1 where the number i sequentially increases as it gets closer to the image side when a surface of a component nearest to the object side is defined as a first surface. The column of radius of curvature Ri shows the value (mm) of a radius of curvature of the i-th surface from the object side in association with Ri of FIG. 1C. Similarly, the column of on-axis surface spacing Di shows a spacing (mm) on the optical axis between the i-th surface Si and the (i+1)th surface Si+1 from the object side. The column of Ndi shows the value of a refractive index with respect to the d-line (587.6 nm) between the i-th surface Si and the (i+1)th surface Si+1. The column of vdj shows the value of an Abbe number of a j-th optical component from the object side at the d-line. FIG. 6A also shows the values of a focal length f (mm), an angle of view (2ω), and an F number (FNO.) of the entire system at the wide-angle end and the telephoto end.

The zoom lens according to Example 1 is configured such that the aperture diaphragm St and the respective lens groups are moved on the optical axis in accordance with zooming. For this reason, the on-axis surface spacings D5, D11, D12, D17, and D19 between the aperture diaphragm St and the lens groups are variable. FIG. 6B shows the values at the wide-angle end, the intermediate area, and the telephoto end as data regarding the on-axis surface spacings D5, D11, D12, D17, and D19 during zooming.

With regard to lens data of FIG. 6A, a symbol "*" attached to the left side of the surface number indicates that the corresponding lens surface is aspheric. The zoom lens according to Example 1 is configured such that both surfaces S16 and S17 of the single lens L33 in the third lens group G3 and the object-side surface S18 of the positive lens L41 in the fourth lens group G4 are aspheric. With regard to basic lens data of FIG. 6A, the numerical value of a paraxial radius of curvature is described as a radius of curvature of the aspheric surface.

FIG. 7 shows aspheric data in the zoom lens according to Example 1. With regard to the numerical values described as aspheric data, a symbol "E" indicates that a subsequent numerical value is an "exponent" to base 10, and that a numerical value expressed by an exponential function to base 10 is multiplied to a numerical valve ahead of "E". For example, "1.0E−0.2" means "1.0×10$^{-2}$".

As aspheric data of the zoom lens according to Example 1, the values of coefficients $A_n$ and K in an aspheric expression expressed by the following expression (A) are described. Specifically, Z indicates a length (mm) of a line of a perpendicular drawn from a point of an aspheric surface at a height h from the optical axis to a tangential plane at the apex of the aspheric surface (a plane perpendicular to the optical axis).

$$Z = C \cdot h^2 / [1 + (1 - K \cdot C^2 \cdot h^2)^{1/2}] + \Sigma A_n \cdot h^n \quad (A)$$

(where n=an integer of 3 or more)
For the expression (A),
Z: a depth (mm) of the aspheric surface
h: a distance (height) (mm) from the optical axis to the lens surface
K: eccentricity
C: a paraxial curvature=1/R (R: paraxial radius of curvature)
$A_n$: an n-order aspheric coefficient The aspheric surface of the zoom lens according to Example 1 effectively uses the orders of $A_3$ to $A_{14}$ as the aspheric coefficient $A_n$.

Figure 2A:
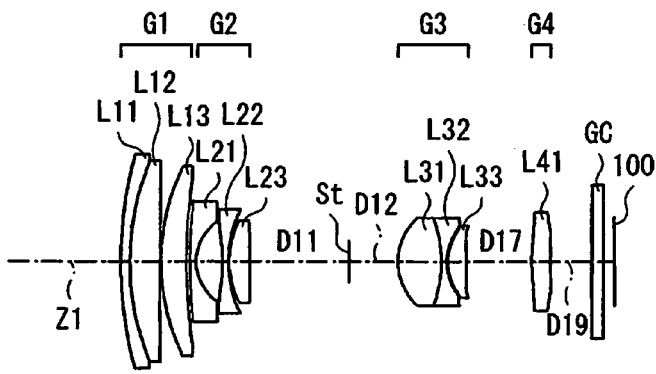
FIGS. 2A to 2C are lens sectional views corresponding to Example 2, showing a second configuration example of a zoom lens according to an exemplary embodiment of the invention.
Figure 2B:
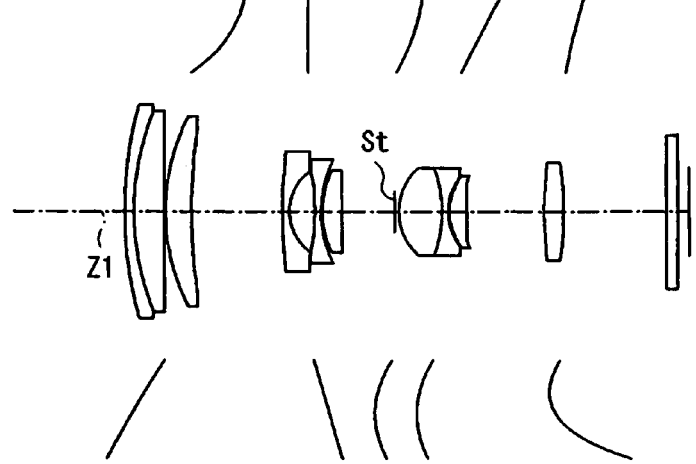
Figure 2C:
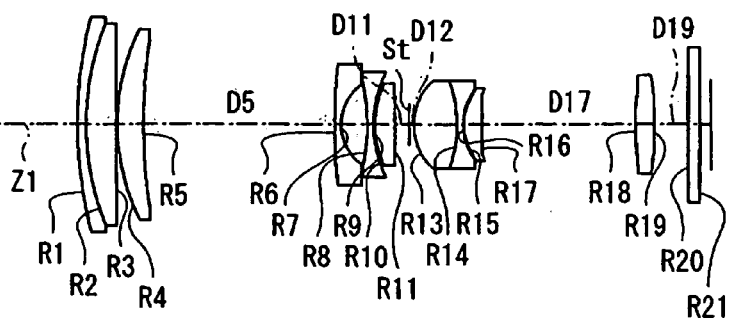

Similarly to the zoom lens according to Example 1, FIGS. 8A, 8B, and 9 show specific lens data corresponding to the configuration of the zoom lens shown in FIGS. 2A, 2B, and 2C as Example 2. The zoom lens according to Example 2 is configured such that both surfaces S16 and S17 of the single lens L33 in the third lens group G3 and both surfaces S18 and S19 of the positive lens L41 in the fourth lens group G4 are aspheric.

Figure 3A:
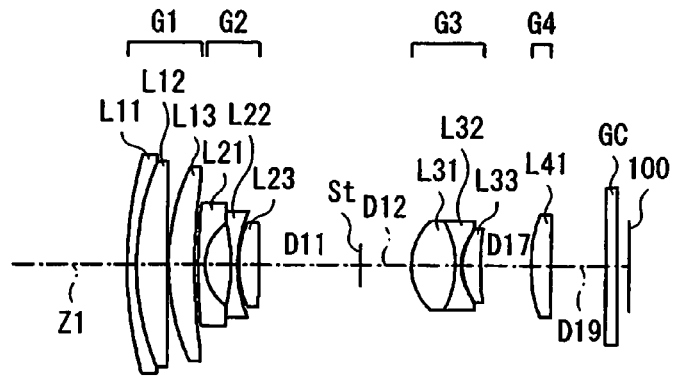
FIGS. 3A to 3C are lens sectional views corresponding to Example 3, showing a third configuration example of a zoom lens according to an exemplary embodiment of the invention.
Figure 3B:
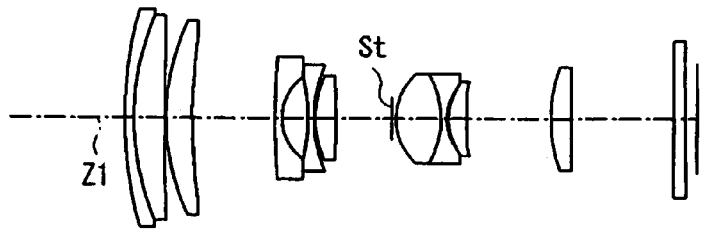
Figure 3C:
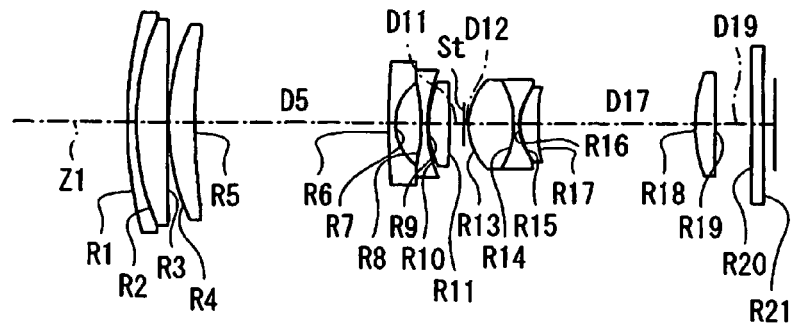
Figure 4A:
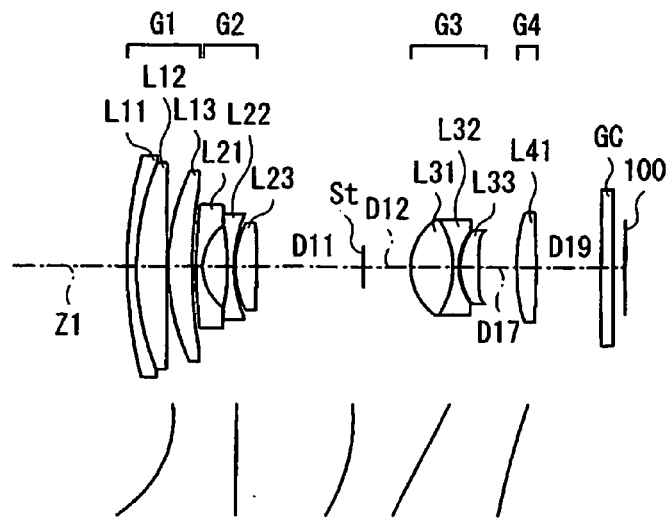
FIGS. 4A to 4C are lens sectional views corresponding to Example 4, showing a fourth configuration example of a zoom lens according to an exemplary embodiment of the invention.
Figure 4B:
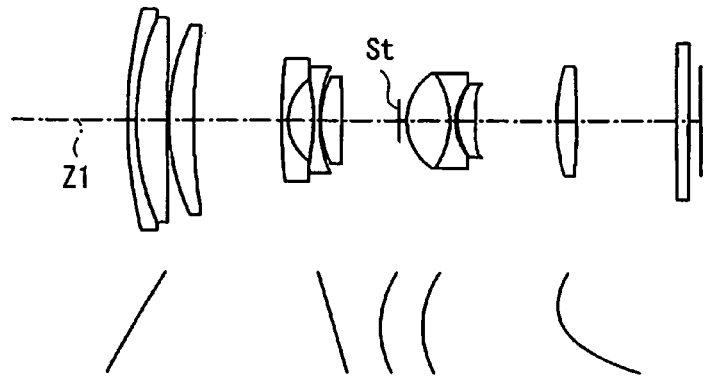
Figure 4C:
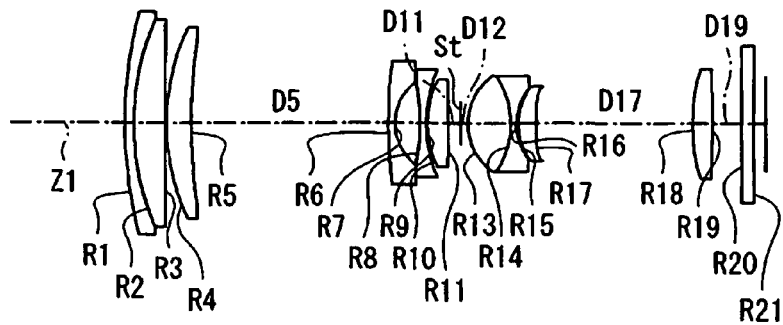
Figure 5A:
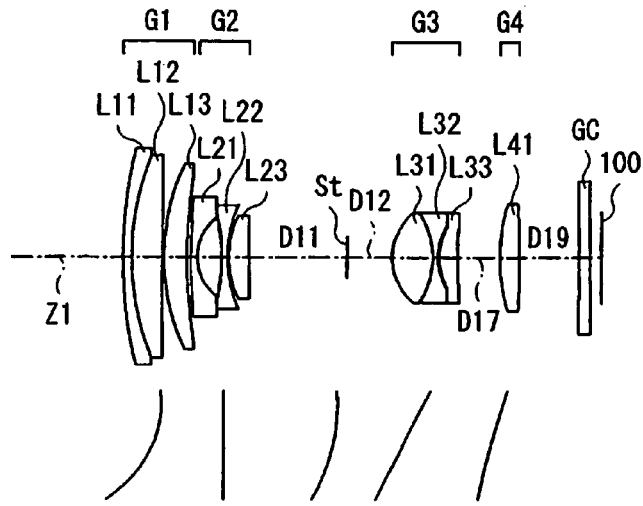
FIGS. 5A to 5C are lens sectional views corresponding to Example 5, showing a fifth configuration example of a zoom lens according to an exemplary embodiment of the invention.
Figure 5B:
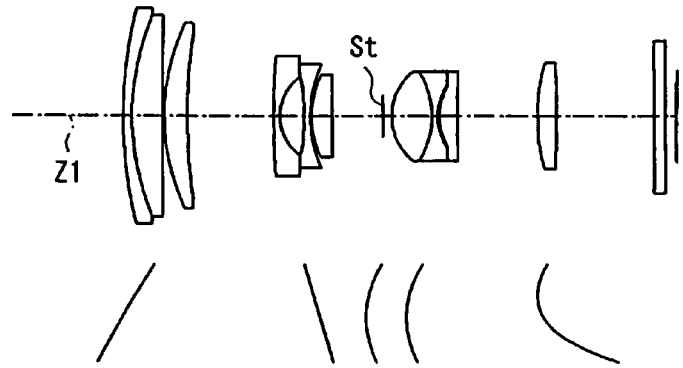
Figure 5C:
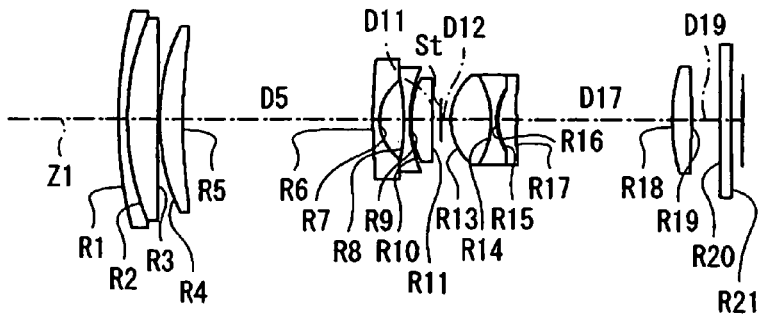
Figures 19A, 19B, 19C, 19D:
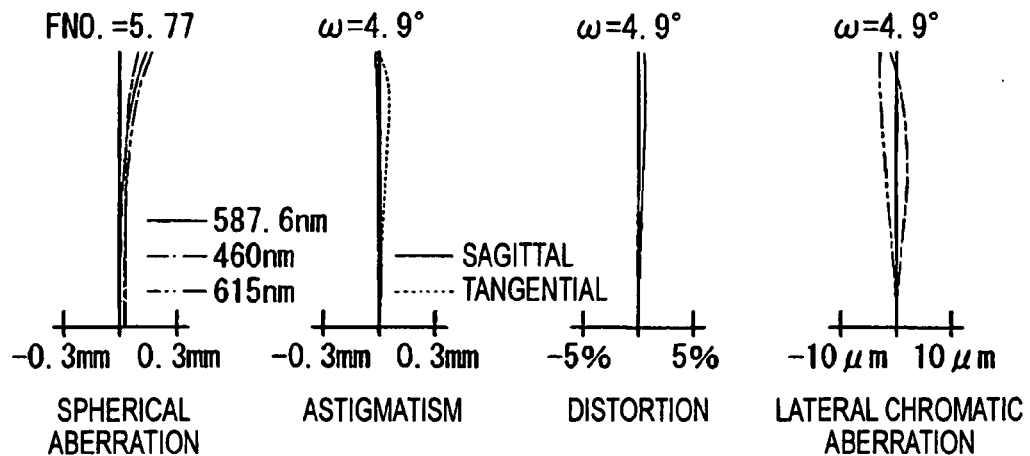
FIGS. 19A to 19D are aberration diagrams showing aberrations at a telephoto end in the zoom lens according to Example 1, specifically.
Figures 20A, 20B, 20C, 20D:
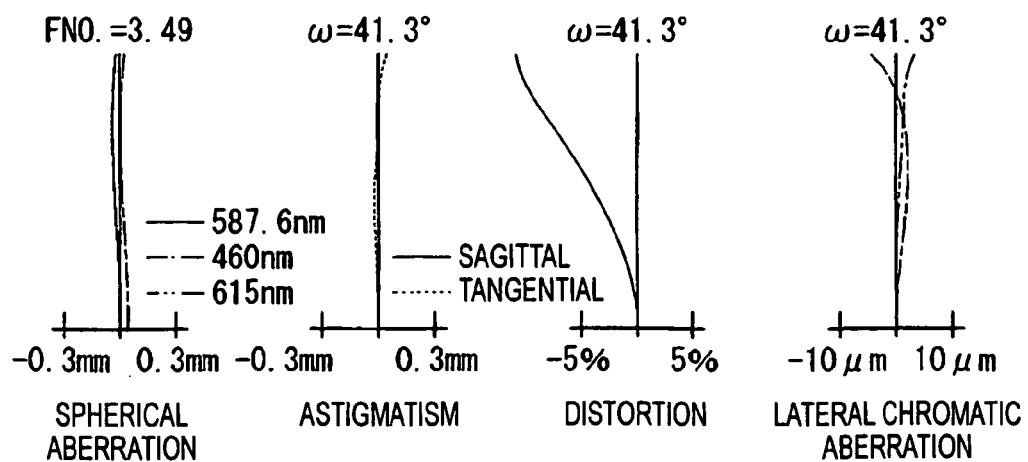
FIGS. 20A to 20D are aberration diagrams showing aberrations at a wide-angle end in the zoom lens according to Example 2, specifically.
Figures 29A, 29B, 29C, 29D:
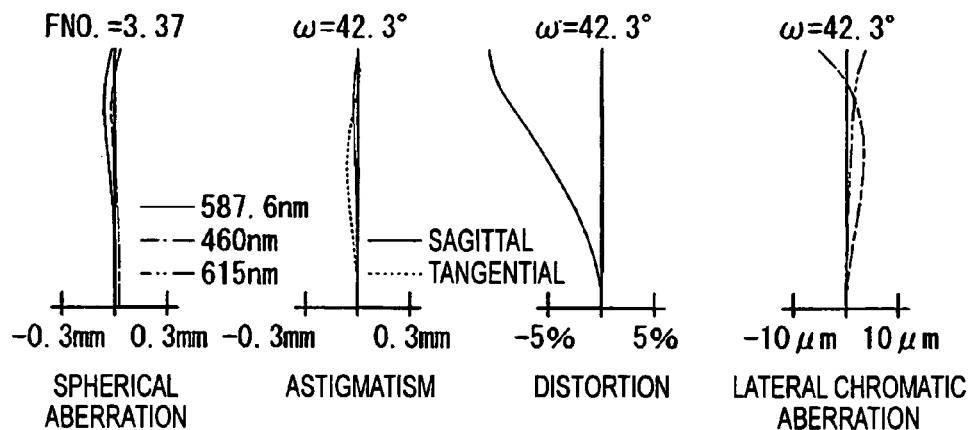
FIGS. 29A to 29D are aberration diagrams showing aberrations at a wide-angle end in the zoom lens according to Example 5, specifically
Figures 30A, 30B, 30C, 30D:
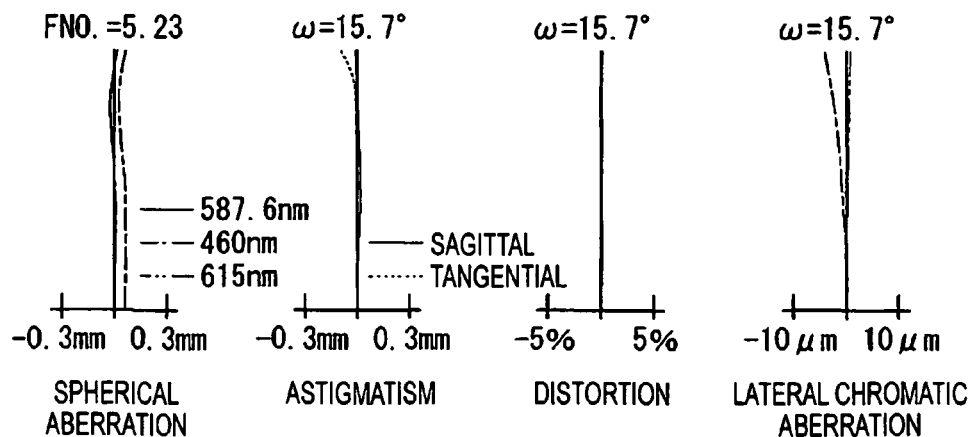
FIGS. 30A to 30D are aberration diagrams showing aberrations at an intermediate area in the zoom lens according to Example 5, specifically.

Similarly, FIGS. 10A, 10B, and 11 show specific lens data corresponding to the configuration of the zoom lens shown in FIGS. 3A, 313, and 3C as Example 3. FIGS. 12A, 12B, and 13 show specific lens data corresponding to the configuration of the zoom lens shown in FIGS. 4A, 4B, and 4C as Example 4, FIGS. 14A, 14B, and 15 show specific lens data corresponding to the configuration of the zoom lens shown in FIGS. 5A, 5B, and 5C as Example 5.

The zoom lenses of Examples 3 to 5 are configured such that the same surfaces as those in the zoom lens according to Example 1 are aspheric.

FIG. 16 collectively shows the values regarding the above-described conditional expressions for the respective examples. As can be understood from FIG. 16, the values of Example 1 fall within the numerical range with respect to the respective conditional expressions.

FIGS. 17A to 17D show spherical aberration, astigmatism, distortion, and lateral chromatic aberration at the wide-angle end in the zoom lens according to Example 1. FIG. 18A to 18D show the same aberrations at the intermediate area, and FIGS. 19A to 19D show the same aberrations at the telephoto end. The aberration diagrams, show aberrations with the d-line (587.6 nm) as a reference waveform. The spherical aberration diagram and the lateral chromatic aberration diagram also show aberrations at the wavelength 460 nm and the wavelength 615 nm. In the astigmatism diagram, a solid line indicates a sagittal direction, and a broken line indicates a tangential direction. FNO. is an F value, and ω is a half angle of view.

Similarly, aberrations in the zoom lens according to Example 2 are shown in FIGS. 20A to 20D (wide-angle end), FIGS. 21A to 21D (intermediate area), and FIGS. 22A to 22D (telephoto end). Aberrations in the zoom lenses according to Examples 3 to 5 are respectively shown in FIGS. 23A to 23D to FIGS. 31A to 31D.

As can be understood from the above-described numerical data and aberration diagrams, in each example, the aberrations at the respective zooming areas are satisfactorily corrected. Therefore, a zoom lens with a high zooming ratio and a reduced size is realized.

The invention is not limited to the foregoing embodiment and the examples, and various modifications may be made. For example, the values of the radius of curvature, the on-axis surface spacing, and the refractive index of the respective lens component are not limited to the numerical values described in the foregoing numerical examples, and other values may be used.

What is claimed is:

1. A zoom lens comprising: in order from an object side thereof,
   a first lens group having a positive refractive power;
   a second lens group having a negative refractive power;
   a stop;
   a third lens group having a positive refractive power; and
   a fourth lens group having a positive refractive power,
   wherein zooming of the zoom lens is performed by moving at least the first lens group, the second lens group, the stop, and the third lens group along an optical axis of the zoom lens,
   when the zooming is performed, the stop is moved so as to be closer to an image plane at a wide-angle end than at a telephoto end of the zoom lens and to be closer to the second lens group at the telephoto end than at the wide-angle end, and
   the following conditional expressions are satisfied:

$$4.0 < f1/fw < 7.0 \quad (1)$$

$$0.2 < X1/ft < 0.3 \quad (2)$$

wherein
   fw represents a focal length of the zoom lens at the wide-angle end,
   ft represents a focal length of the zoom lens at the telephoto end,
   f1 represents a composite focal length of the first lens group, and
   x1 represents a displacement of the first lens group during the zooming from the wide-angle end to the telephoto end.

2. The zoom lens according to claim 1, wherein the following conditional expression is satisfied:

$$0.2 < f3/f4 < 0.5 \quad (3)$$

wherein
   f3 represents a composite focal length of the third lens group, and
   f4 represents a composite focal length of the fourth lens group.

3. The zoom lens according to claim 1, wherein the following conditional expression is satisfied:

$$0.0 < Dw/ft < 0.1 \qquad (4)$$

wherein Dw represents a spacing on the optical axis between the stop and a lens surface of the third lens group nearest to the object side at the wide-angle end.

4. The zoom lens according to claim 1, wherein
the first lens group includes, in order from the object side, a cemented lens having a negative meniscus lens having a convex surface on the object side and a positive lens having a convex surface on the object side, and a positive meniscus lens having a convex surface on the object side, and
the following conditional expressions are satisfied:

$$1.57 < N12 < 1.65 \qquad (5)$$

$$62.0 < v12 < 70 \qquad (6)$$

wherein
N12 represents a refractive index of the positive lens constituting the cemented lens in the first lens group at the d-line, and
v12 represents an Abbe number of the positive lens constituting the cemented lens in the first lens group at the d-line.

5. The zoom lens according to claim 1, wherein the following conditional expression is satisfied:

$$0.4 < (Pt-Pw)/fw < 0.9 \qquad (7)$$

wherein
Pw represents a distance on the optical axis between the stop and the image plane at the wide-angle end, and
Pt represents a distance on the optical axis between the stop and the image plane at the telephoto end.

6. The zoom lens according to claim 1, wherein the following conditional expression is satisfied:

$$0.7 < IH/fw < 0.9 \qquad (8)$$

wherein IFI represents a maximum image height of the zoom lens.

7. The zoom lens according to claim 1, wherein the third lens group includes, in order from the object side, a cemented lens having a positive lens where an object-side surface thereof is a convex surface having a radius of curvature whose absolute value is smaller than that of an image-side surface thereof and a negative lens having a concave surface on the image side, and a single lens where at least one surface is aspheric.

8. The zoom lens according to claim 1, wherein the fourth lens group includes one positive lens, and at least an object-side surface of the positive lens is aspheric.

9. The zoom lens according to claim 1, wherein the fourth lens group is moved during focusing.

10. An imaging apparatus comprising:
a zoom lens according to claim 1; and
an imaging device outputting an imaging signal according to an optical image formed by the zoom lens.

11. The zoom lens according to claim 1, wherein
the second lens group includes, in order from the object side, a negative lens where an image-side surface thereof is a concave surface having a radius of curvature whose absolute value is smaller than that of an object-side surface thereof, a biconcave lens, and a positive lens having a convex surface on the object side, and
the lenses in the second lens group are not cemented to each other.

12. The zoom lens according to claim 11, wherein the following conditional expression is satisfied:

$$20 < v23 < 25 \qquad (9)$$

wherein v23 represents an Abbe number of the positive lens in the second lens group at the d-line.

* * * * *